United States Patent
Wong et al.

(10) Patent No.: US 12,052,747 B2
(45) Date of Patent: Jul. 30, 2024

(54) COMMUNICATIONS DEVICE, INFRASTRUCTURE EQUIPMENT AND METHODS FOR LOGICAL CHANNEL PRIORITIZATION SCHEME SELECTION

(71) Applicant: Sony Group Corporation, Tokyo (JP)

(72) Inventors: Shin Horng Wong, Basingstoke (GB);
Yassin Aden Awad, Basingstoke (GB);
Vivek Sharma, Basingstoke (GB);
Kazuyuki Shimezawa, Basingstoke (GB); Martin Warwick Beale, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 441 days.

(21) Appl. No.: 17/431,440

(22) PCT Filed: Feb. 17, 2020

(86) PCT No.: PCT/EP2020/054088
§ 371 (c)(1),
(2) Date: Aug. 17, 2021

(87) PCT Pub. No.: WO2020/193012
PCT Pub. Date: Oct. 1, 2020

(65) Prior Publication Data
US 2022/0141848 A1 May 5, 2022

(30) Foreign Application Priority Data
Mar. 28, 2019 (EP) .................................... 19166023

(51) Int. Cl.
*H04W 72/566* (2023.01)
*H04L 5/00* (2006.01)
(Continued)

(52) U.S. Cl.
CPC ......... *H04W 72/566* (2023.01); *H04L 5/0007* (2013.01); *H04W 72/0446* (2013.01); *H04W 72/21* (2023.01)

(58) Field of Classification Search
CPC ........... H04W 72/566; H04W 72/0446; H04W 72/21; H04W 72/56; H04L 5/0007
See application file for complete search history.

(56) References Cited

U.S. PATENT DOCUMENTS

2018/0324768 A1* 11/2018 Shaheen ................ H04L 5/0053
2021/0266953 A1* 8/2021 Pelletier ............ H04W 72/1268

FOREIGN PATENT DOCUMENTS

WO 2018/082501 A1 5/2018
WO 2020/148122 A1 7/2020

OTHER PUBLICATIONS

International Search Report and Written Opinion mailed on May 28, 2020, received for PCT Application PCT/EP2020/054088, Filed on Feb. 17, 2020, 10 pages.
(Continued)

*Primary Examiner* — Justin T Van Roie
(74) *Attorney, Agent, or Firm* — XSENSUS LLP

(57) ABSTRACT

A method of selecting data for transmission in a wireless communications network by a communications device, the method includes receiving by the communications device an allocation message, the allocation message including an indication of first communications resources for transmitting of data from a first group of one or more of a plurality of logical channels and the allocation message is received in response to a second scheduling request message requesting the first communications resources for transmitting the data from the first group of the one or more logical channels which was transmitted after a first scheduling request message requesting second communications resources for trans- (Continued)

mitting data from a second group of the one or more of the plurality of logical channels, in response to receiving the allocation message.

20 Claims, 19 Drawing Sheets

(51) Int. Cl.
*H04W 72/0446* (2023.01)
*H04W 72/21* (2023.01)

(56) References Cited

OTHER PUBLICATIONS

3GPP, "Study on NR Industrial Internet of Things (IoT); Release 16" 3GPP TR 38.825 V0.0.1, Nov. 2018, pp. 1-12.
3GPP, "NR; Medium Access Control (MAC) Protocol Specification (Release 15)", 3GPP TS 38.321, V15.3.0, Sep. 2018, pp. 1-76.
3GPP, "LS on Intra-UE Prioritization/Multiplexing", 3GPP TSG-RAN WG2 Meeting #104, R2-1818795, Nov. 12-16, 2018, 2 pages.
Qualcomm Incorporated, "LCP with Multiple Numerologies", 3GPP TSG-RAN WG2 Meetings #98, R2-17xxxx, May 15-19, 2017, pp. 1-3.
3GPP, "NR; Medium Access Control (MAC) Protocol Specification (Release 15)", 3GPP TS 38.321 V15.4.0, Dec. 2018, pp. 1-77.
Holma et al., "LTE for UMTS OFDMA and SC-FDMA Based Radio Access", John Wiley & Sons, 2009, pp. 25-27.
Nokia et al., "Revised SID: Study on NR Industrial Internet of Things (IoT)", 3GPP TSG RAN meeting #81, RP-182090, Sep. 10-13, 2018, 5 pages.

\* cited by examiner

COMMUNICATIONS DEVICE, INFRASTRUCTURE EQUIPMENT AND METHODS FOR LOGICAL CHANNEL PRIORITIZATION SCHEME SELECTION

CROSS-REFERENCE TO RELATED APPLICATIONS

The present application is based on PCT filing PCT/EP2020/054088, filed Feb. 17, 2020, which claims priority to EP 19166023.2, filed Mar. 28, 2019, the entire contents of each are incorporated herein by reference.

BACKGROUND

Field

The present disclosure relates to communications devices, infrastructure equipment and methods for the selection of data for transmission by a communications device in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

An example of such a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems.

The increasing use of different types of communications devices associated with different traffic profiles gives rise to new challenges for efficiently handling communications in wireless telecommunications systems that need to be addressed.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
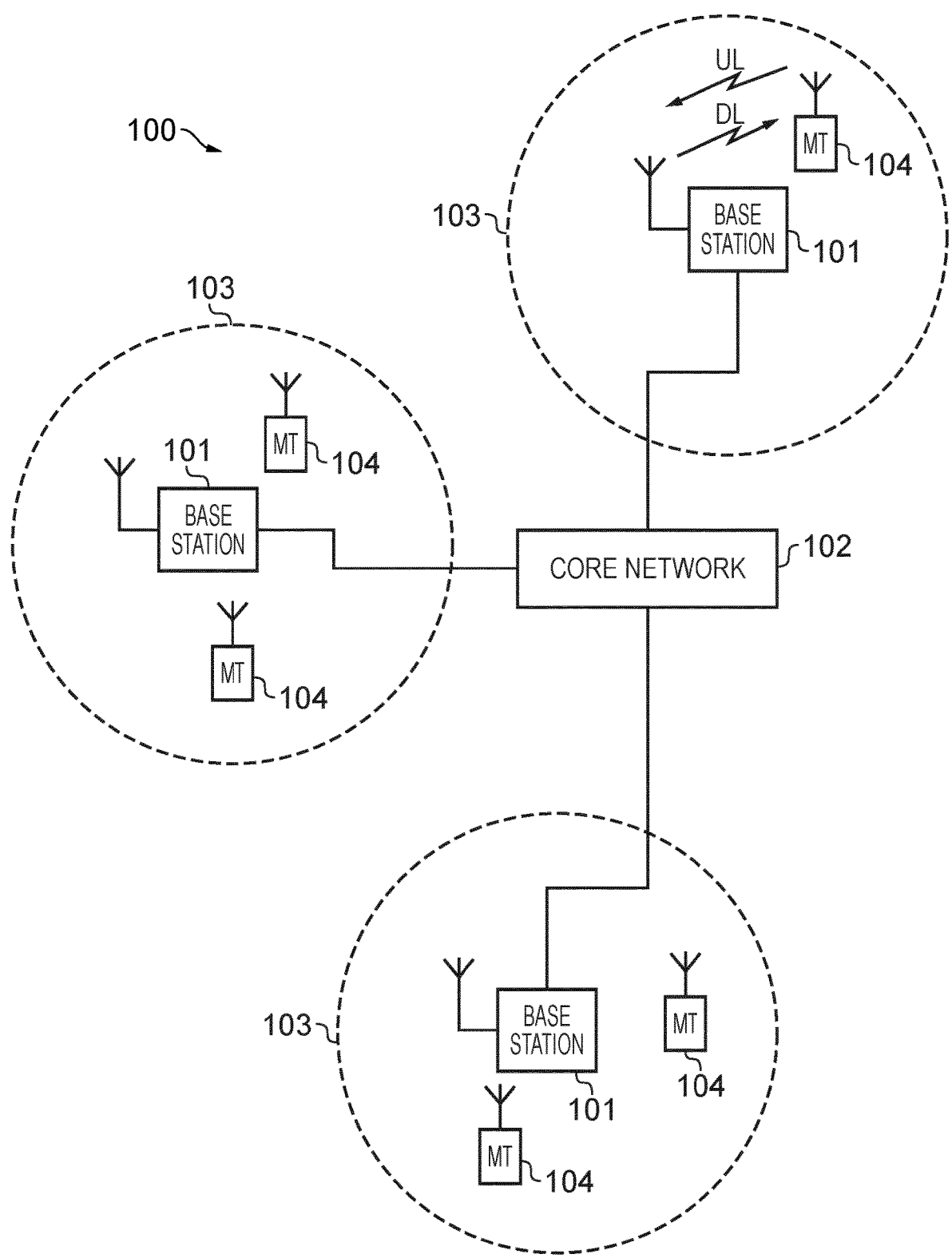
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
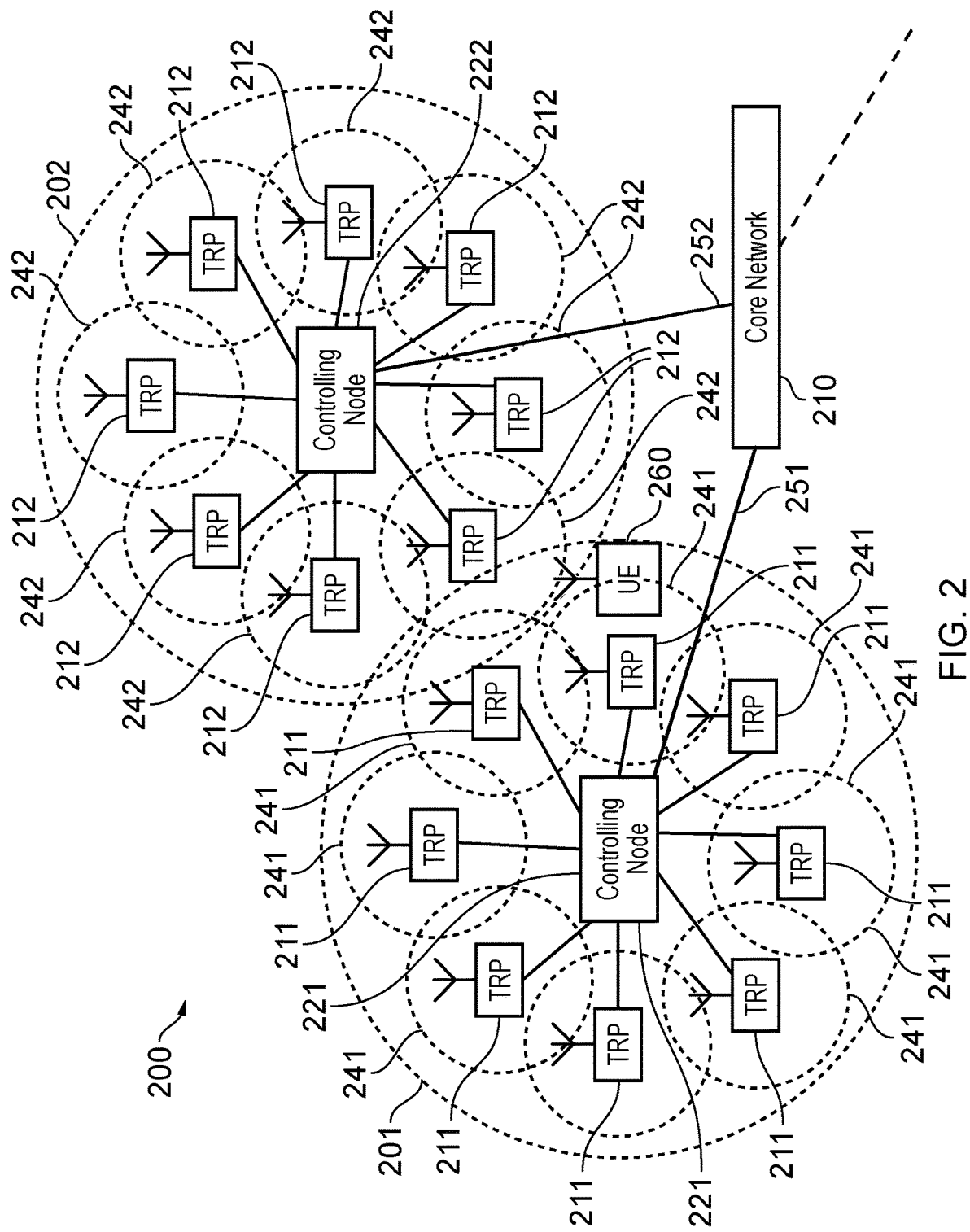
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
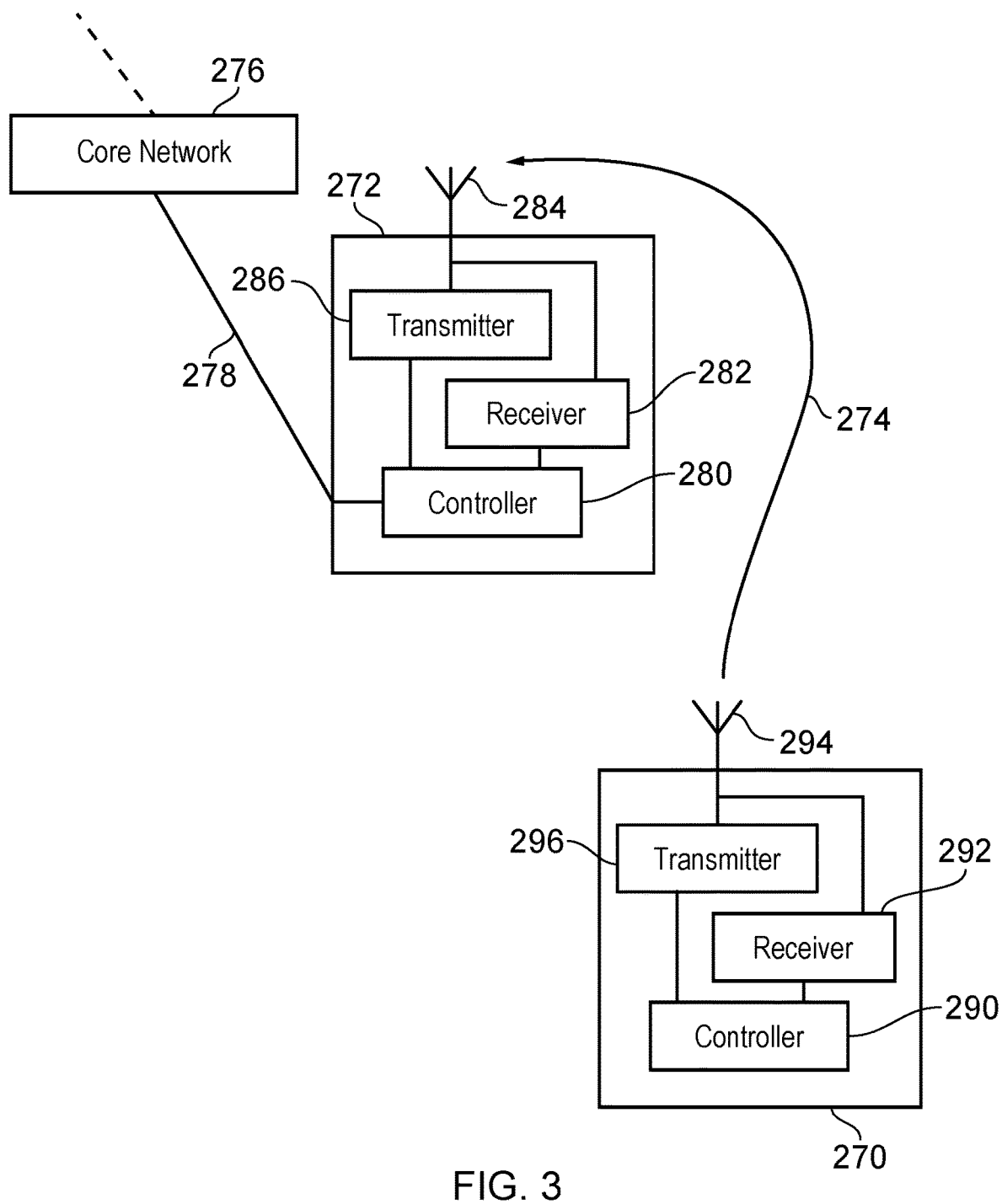
FIG. 3 is a schematic block diagram of an example infrastructure equipment and communications device which may be configured in accordance with example embodiments.

A more detailed illustration of a UE 270 and an example network infrastructure equipment 272, which may be thought of as a gNB 101 or a combination of a controlling node 221 and TRP 211, is presented in FIG. 3. As shown in FIG. 3, the UE 270 is shown to transmit uplink data to the infrastructure equipment 272 via resources of a wireless access interface as illustrated generally by an arrow 274. As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, the UE 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

5G, URLLC and Industrial Internet of Things

Systems incorporating NR technology are expected to support different services (or types of services), which may be characterised by different requirements for latency, data rate and/or reliability. For example, Enhanced Mobile Broadband (eMBB) services are characterised by high capacity with a requirement to support up to 20 Gb/s. The requirements for Ultra Reliable & Low Latency Communications (URLLC) [4] services are for a reliability of $1-10^{-5}$ (99.999%) or higher for one transmission of a 32 byte packet with a user plane latency of 1 ms [3]. In some scenarios, there may be a requirement for a reliability of $1-10^{-6}$ (99.9999%) or higher with either 0.5 ms or 1 ms of user plane latency measured from the ingress of a layer 2 packet to its egress from the network. Massive Machine Type Communications (mMTC) is another example of a service which may be supported by NR-based communications networks.

In addition, systems may be expected to support further enhancements related to Industrial Internet of Things (IIoT) in order to support services with new requirements of high availability, high reliability, low latency, and in some cases, high-accuracy positioning.

Industrial automation, energy power distribution and intelligent transport systems are examples of new use cases for Industrial Internet of Things (IIoT). In an example of industrial automation, the system may involve different distributed components working together. These components may include sensors, virtualized hardware controllers and autonomous robots, which may be capable of initiating actions or reacting to critical events occurring within a factory and communicating over a local area network.

The UEs in the network may therefore be expected to handle a mixture of different traffic, for example, associated with different applications and potentially different quality of service requirements (such as maximum latency, reliability, packet sizes, throughput). Some messages for transmission may be time sensitive and be associated with strict deadlines and the communications network may therefore be required to provide time sensitive networking (TSN) [5].

URLLC services are required in order to meet the requirements for IIoT, which require high availability, high reliability, low latency, and in some cases, high-accuracy positioning [1]. Some IIoT services may be implemented by using a mixture of eMBB and URLLC techniques, where some data is transmitted by eMBB and other data is transmitted by URLLC. Furthermore, one of the requirements for communicating uplink data from a UE is to manage intra-UE packet prioritization and multiplexing. This is a requirement to prioritise the communication of uplink data and control packets from different categories of traffic within the UE. A better appreciation of the generation of uplink data of different logical types will be provided in the following section.

Uplink Logical Channel Prioritization

Figure 4:
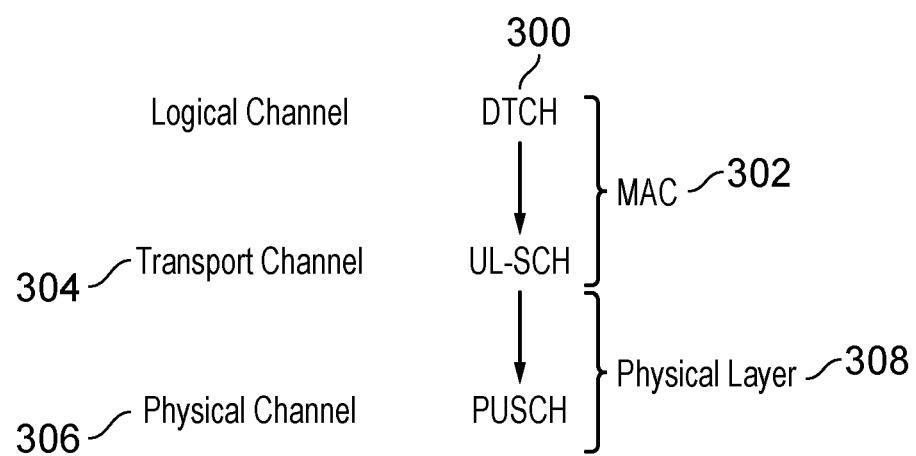
FIG. 4 is a schematic illustration of the processing of data for uplink transmission by a medium access control (MAC) layer and a Physical layer of a communications device or infrastructure equipment, which may be in accordance with embodiments of the present disclosure.

The transmission of uplink data by a communications device to a wireless communications network may be required to support different services, by communicating different types of information and control information. Such data is received from higher layers at a medium access control (MAC) layer. Different types of information are therefore categorized into different Logical Channels. For example MIB or SIB information and user data information are different types of information and therefore they belong to different Logical Channels, namely Broadcast Control Channel (BCCH) and Dedicated Traffic Channel (DTCH) respectively. An illustration is shown in FIG. 4, in which a MAC layer 302 at the UE 270 maps a Logical Channel DTCH 300 to a Transport Channel comprising an Uplink Shared Channel (UL-SCH) 304. As shown in FIG. 4, The UL-SCH Transport Channel 304 is then mapped to a Physical Uplink Shared Channel (PUSCH) 306 within a physical layer 308. The different types of Logical Channels, e.g. BCCH, DTCH, DCCH, have different requirements or priorities and to distinguish them, they are each assigned a different Logical Channel Identity (LCID). Even among data traffic (DTCH) there can be different priorities or requirements and hence multiple DTCH having different priorities may be categorized into different Logical Channels, each having a respective Logical Channel Identity (LCID). Each LCID can be independently configured by the network.

For example, a logical channel having a particular LCID may be configured for the exclusive use of data associated with the URLLC service. Similarly, a further logical channel having a different LCID may be configured for the use of data associated with the eMBB service.

As in LTE, in NR the UE does not decide the number of physical resources it can use to transmit its uplink data but rather, it is the gNB that decides the physical resources, e.g. by scheduling a PUSCH, that the UE can use for the transmission of its data. In 3GPP Release-15 NR, the gNB allocates the PUSCH resource to a particular UE for the transmission of data traffic by that particular UE, but does not allocate the resources to a particular logical channel (DTCH) of the UE. That is, the gNB allocates the UE uplink resources for the transmission of a Transport Block (TB) having a Transport Block Size (TBS) which is dependent upon the allocated PUSCH resources (i.e. number of PRBs, orthogonal frequency division multiplexing, OFDM, symbols) and a modulation and coding scheme (MCS) with which the TB is to be encoded and transmitted. The PUSCH resources can be dynamically granted to the UE, for example via a downlink control information (DCI).

Since the PUSCH resources are not assigned for the transmission of data for a particular logical channel, a transport block can potentially include data from all (or at least a plurality) of the logical channels. The UE therefore performs a Logical Channel Prioritization function [3] at the MAC layer 302 (described in more detail below) to decide from which logical channel(s) the data shall be selected to form the TB to be transmitted using the allocated resources. The MAC layer 302 can multiplex data from multiple logical channels into a single TB.

Scheduling Requests and Grant Based Allocations

According to conventional techniques for uplink transmission, when data arrives from upper protocol layers at a buffer at the medium access control (MAC) protocol layer of the communications device, the communications device may transmit, in response, a Scheduling Request (SR) to the network if the communications device has no uplink transmission/resources scheduled. If the communications device already has some communications resources allocated for uplink transmission, it may additionally or alternatively transmit a buffer status report (BSR), indicating an amount of data in the MAC layer buffer(s).

In order to indicate to the network the nature of the data for which uplink communications resources are requested, one or more LCIDs may be grouped into one or more scheduling request (SR) groups, and thus be associated with an SR ID (scheduling request identity). Preferably, where multiple LCIDs are associated with a same SR ID, the characteristics of those LCIDs (such as latency requirements, permitted data rate, required reliability) are similar. For example, because URLLC data and eMBB data have different quality of service requirements, an SR ID associated with an LCID which is for URLLC service data may preferably be different from an SR ID associated with an LCID which is for eMBB service data.

By means of configuration (such as using RRC configuration), the communications device may be aware of predetermined uplink communications resources associated with each SR ID.

These uplink communications resources may be periodic and for the transmission of an SR. The communications resources may be different for each SR ID. By transmitting an SR using resources associated with a particular SR ID, the communications device indicates that it has data associated with one or more of the LCIDs associated with that SR ID available for transmission, and is accordingly requesting uplink communications resources for the transmission of that data.

The infrastructure equipment which receives the SR may determine, based on the communications resources on which the SR was transmitted, the corresponding SR ID. Thus, the infrastructure equipment may determine the LCID(s) associated with the SR ID, and allocate uplink communications resources according to the requirements associated with those LCIDs.

In response to receiving the SR or BSR, the network (for example, the infrastructure equipment) may send an Uplink Grant carried by downlink control information (DCI) to the communications device. The DCI may be transmitted on a physical downlink control channel (PDCCH).

The Uplink Grant may comprise an indication of uplink communications resources which are allocated (or, in other words, scheduled) for the communications device to transmit its uplink data. The uplink communications resources may be on a physical uplink shared channel (PUSCH). This type of resource allocation is known as grant based (GB) resource, and the allocation may be referred to as a 'dynamic grant' (DG). Grant based resources are suitable for services where the data arrives in variable amounts, and/or is aperiodic, even if such data traffic arrival follows a somewhat predictable traffic pattern. DGs may be signalled by the gNB at the physical layer, for example, by means of downlink control information (DCI).

However, there remains a need to ensure that appropriate data is selected for transmission in response to receiving an indication of an uplink grant.

According to embodiments of the present disclosure, there is provided a method of selecting data for transmission in a wireless communications network by a communications device, the method comprising: receiving by the communications device an allocation message, the allocation message comprising an indication of first communications resources for transmitting of data from a first group of one or more of a plurality of logical channels and the allocation message is received in response to a second scheduling request message requesting the first communications resources for transmitting the data from the first group of the one or more logical channels which was transmitted after a first scheduling request message requesting second communications resources for transmitting data from a second group of the one or more of the plurality of logical channels, in response to receiving the allocation message, selecting a logical channel prioritisation (LCP) scheme for allocating a capacity provided by the first communications resources for transmitting the data from the first group of one or more of the logical channels or from the second group of the one or more of the logical channels using the first communications resources, the LCP scheme being selected from a plurality of LCP schemes, each of the plurality of LCP schemes determining a different allocation of an available capacity provided by the first communications resources for transmitting data from the plurality of logical channels, and selecting data from the plurality of logical channels to be transmitted using the first communications resources in accordance with the selected LCP scheme.

In some embodiments of the present technique, an appropriate logical channel prioritisation scheme is used to select data for transmission using uplink communications resources, in order to better satisfy the requirements of different types of data. Embodiments of the present technique provide for an efficient means for enabling a communications device to select appropriate data for transmission, avoiding additional signalling within downlink control information.

MAC Transport Block

Data may be transmitted by the communications device 104 using uplink communications resources using MAC transport blocks (TB). Each MAC TB is constructed at the MAC protocol layer 302 in response to determining that uplink communications resources are, or will be, scheduled for the communications device and that data is available for uplink transmission.

Data for inclusion in a MAC TB may be selected in accordance with a logical channel prioritisation (LCP) scheme. As described herein, in accordance with embodiments of the present technique as discussed herein, an LCP scheme may be characterised by one or more of:

a priority for data selection associated with one or more different logical channels, a rule for permitting or precluding selection of data from one or more logical channel a trigger or time at which the LCP scheme is to be performed; and a requirement to retain data for future selection for a certain duration.

According to a conventional logical channel prioritisation scheme, data is selected using 'highest priority first' scheduling. That is, data associated with logical channels having the highest priority is added to the MAC TB in preference to data associated with logical channels having lower priorities. In order to provide some fairness in the scheduling, each logical channel may be associated with 'bucket' parameters, according to which a form of bucket scheduling is applied. That is, each logical channel may be subject to maximum throughput constraints, which may permit a high throughput over a short period of time, while limiting a long-term throughput; alternatively, the throughput constraints may limit throughput over a short term while allowing high throughput over a longer time period.

Each LCID may conventionally have a configured priority (a lower number means higher priority) and a Maximum Bucket Size, where the Maximum Bucket Size is derived from configured parameters prioritisedBitRate and bucketSizeDuration, i.e. Maximum Bucket Size=prioritisedBitRate×bucketSizeDuration. The conventional Logical Channel Prioritization function maintains a dynamic bucket, Bj (bits) for LCID j, such that:

Prior to allocation, bucket Bj is incremented by prioritisedBitRate×TBucket,j, where is TBucket,j is the time between updates of the bucket Bj. The value of TBucket,j is up to UE implementation. The value of Bj cannot be greater than the Maximum Bucket Size for LCID j;

After allocation, bucket Bj is reduced by the number of bits from LCID j that are carried by the TB.

This conventional scheme may correspond in some embodiments of the present technique to a 'default' LCP.

In accordance with conventional techniques, such as those specified in 3GPP Release 15 NR, each LCID may also be configured with an allowedSCS-List and a maxPUSCH- Duration. The allowedSCS-List is a set of subcarrier spacings of the PUSCH that the LCID is allowed to use. That is, if the scheduled PUSCH has a subcarrier spacing of 60 kHz and an LCID has an allowed set of subcarrier spacings of {15 kHz, 30 kHz}, then the data from this LCID is not allowed to be multiplexed into a MAC TB transmitted using a PUSCH having the 60 kHz subcarrier spacing.

The maxPUSCH-Duration specifies a maximum duration of an allocated PUSCH in milliseconds (ms) in which a MAC TB may be transmitted which includes data from that LCID. This prevents data associated with an LCID that has a low latency requirement being carried by a PUSCH that has a very long duration thereby causing the data to exceed the latency requirement associated with the LCID.

For example, a first LCID may be configured with a maxPUSCH-Duration of 0.5 ms and a second LCID may be configured with a maxPUSCH-Duration of 0.04 ms. If allocated PUSCH communications resources occupy 4 OFDM symbols at 15 kHz, i.e. 0.286 ms, then data associated with the first LCID is allowed to be transmitted within a MAC TB transmitted using this PUSCH, since the PUSCH duration is less than its maxPUSCH-Duration of 0.5 ms. On the other hand, data associated with the second LCID is not allowed to be transmitted within a MAC TB transmitted using this PUSCH, since the PUSCH duration is larger than its maxPUSCH-Duration of 0.04 ms.

The following are parameters that may be configurable for an Uplink Logical Channel:

- Logical Channel ID (LCID): As described above, it is used to distinguish one type of Logical Channel from another;
- Priority: A rank of the priority of the logical channel where the lower the number the higher the priority;
- prioritisedBitRate: As described above to determine the Bucket Size Bj. This is a representation of the bit rate requirement of the Logical Channel
- bucketSizeDuration: As described above to determine the Bucket Size Bj;
- maxPUSCH-Duration: As described above, data from this Logical Channel may be multiplexed into a TB only if the corresponding granted PUSCH duration does not exceed the value of this parameter;
- allowedSCS-List: A set of subcarrier spacings, where data from this Logical Channel is multiplexed into the TB if the subcarrier spacing of the granted PUSCH falls into a subcarrier spacing in this set
- Scheduling Request ID (SR ID): If this is configured for an LCID, then when data associated with this Logical Channel is available and no uplink resources are available, a corresponding Scheduling Request will use PUCCH (physical uplink control channel) resources corresponding to (i.e. configured for) this SR ID;
- Logical Chanel Group ID (LCG-ID): A Buffer Status Report (BSR) is triggered when any LCID's belonging to this LCG-ID has data in its buffer. That is, a BSR reports the data buffer status of all the LCID's within a LCG-ID.

Out of Order and Conflicting Uplink Grants

In order to minimise the delay in transmitting uplink data, the communications device 104 may conventionally transmit an SR soon after determining that uplink data is available for transmission.

If further data, particularly associated with different LCIDs, subsequently is made available for transmission, the communications device 104 may transmit a subsequent SR.

The infrastructure equipment may respond to both SRs by transmitting two DCIs, each allocating uplink communications resources.

In some scenarios, the communications device is able to transmit using both uplink communications resources and therefore, in response to the DCIs, the communications device selects data for transmission using each of the uplink communications resources.

Figure 5:
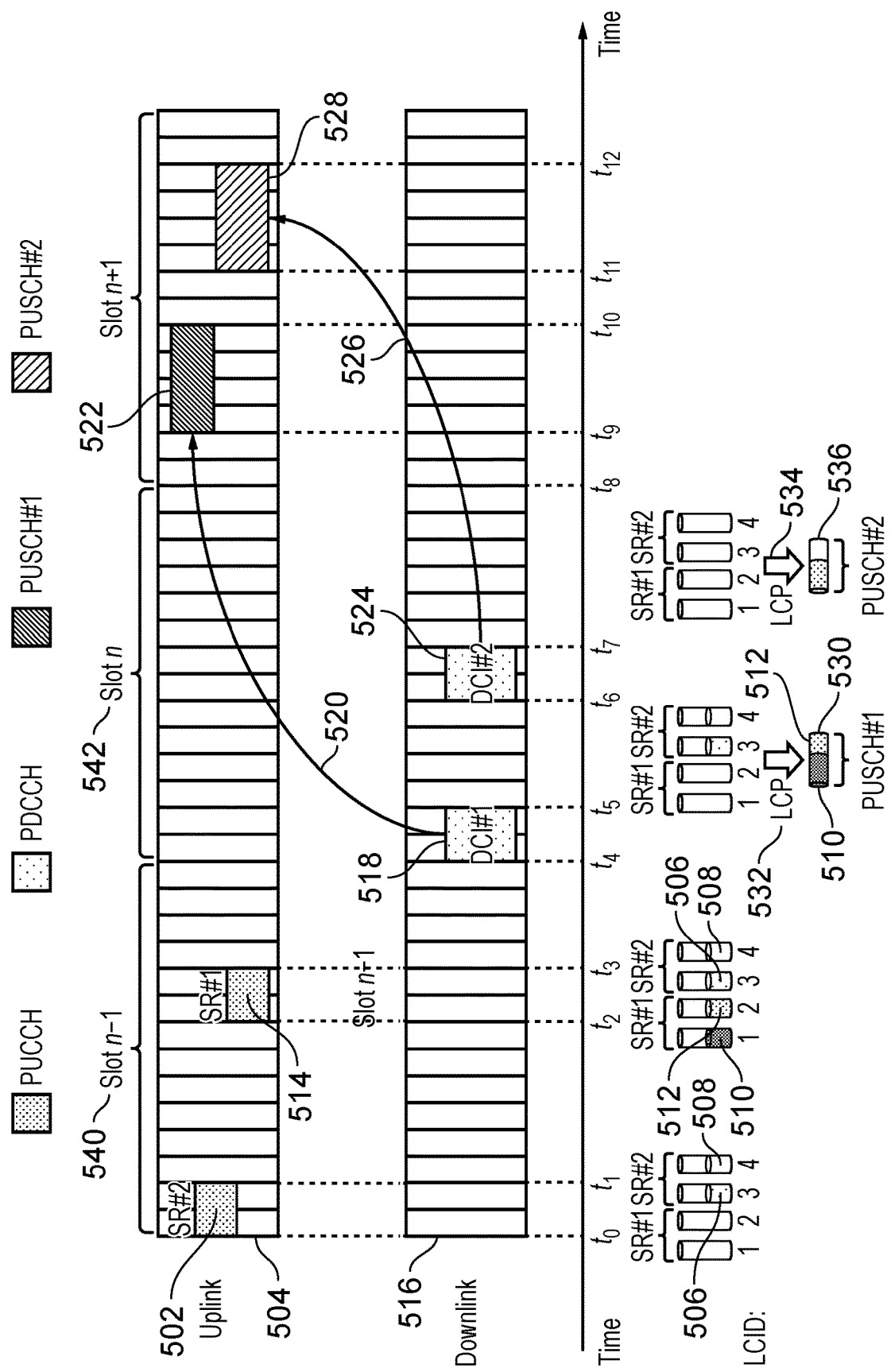
FIG. 5 illustrates a sequence of transmissions in accordance with conventional techniques in which data is transmitted using two allocated uplink communications resources.

FIG. 5 illustrates a sequence of transmissions in accordance with conventional techniques in which data is transmitted using two allocated uplink communications resources.

In the example of FIG. 5, the communications device 104 is configured to transmit data associated with four logical channels, associated with logical channel IDs 1 to 4. Data associated with LCID 1 has highest priority, and data associated with LCID 4 has the lowest priority.

The sequence of FIG. 5 begins with the transmission of a first SR 502 on the uplink of the wireless access interface 504 within a first timeslot n−1 540. The transmission of the first SR 502 begins at time t0 in response to a determination by the communications device 104 that it has first data 506 and second data 508, associated with LCIDs 3 and 4 respectively, available for transmission.

In the example of FIG. 5, LCIDs 3 and 4 are both associated with SR ID 2 and thus the first SR 502 is transmitted using predetermined (e.g. configured) uplink communications resources associated with SR ID 2.

Subsequently, the communications device 104 determines that third data 510 and fourth data 512 are available for transmission. The third data 510 and fourth data 512 are associated with LCIDs 1 and 2 respectively. In this example, LCIDs 1 and 2 are both associated with SR ID 1 and accordingly, at time t2, still within the first timeslot 540, the communications device 104 transmits, using communications resources associated with SR ID 1, a second SR 514.

The first and second SRs 502, 514 may be transmitted on a physical uplink control channel (PUCCH) of the uplink of the wireless access interface 504.

In response to the first SR 502, the infrastructure equipment 101 transmits, on the downlink of the wireless access interface 516, at time t4 during a second timeslot n 542, first downlink control information (DCI) 518. As indicated by the arrow 520, the first DCI 518 allocates first uplink communications resources 522.

In response to the second SR 514, the infrastructure equipment 101 transmits, at time t6 and also within the second timeslot 542, second downlink control information (DCI) 524. As indicated by the arrow 526, the second DCI 524 allocates second uplink communications resources 528.

The first and second DCIs 518, 524 may be transmitted on a physical downlink control channel (PDCCH) of the downlink of the wireless access interface 516.

The first and second communications resources 522, 528 may comprise resources on physical uplink shared channels (PUSCH) of the uplink of the wireless access interface 504.

In response to receiving the first DCI 518, the communications device 104 selects data for transmission using the first uplink communications resources 522 by means of a first LCP instance 532. This is done in a conventional manner, according to which data is selected using a highest priority first scheme. Accordingly, a first MAC TB 530 is formed comprising the third data 510 and the fourth data 512, since this data, being associated with LCIDs 1 and 2 respectively, has the highest priority. In the example of FIG. 5, there is no restriction on the inclusion of any of the third data 510 and fourth data 512 based on, for example, LCID parameters limiting the maximum throughput for the respective logical channels.

In response to receiving the second DCI 524, the communications device 104 selects data for transmission using the second uplink communications resources 528 by means of a second LCP instance 534. Again, this is done in a conventional manner, according to which data is selected using a highest priority first scheme. Accordingly, a second MAC TB 536 is formed comprising the first data 506 and the second data 508, since no other higher priority data is remaining to be selected for transmission. In the example of FIG. 5, there is no restriction on the inclusion of any of the first data 506 and the second data 508.

Subsequently, at time t9, the communications device transmits the first MAC TB 510 comprising the third data 510 and the fourth data 512 using the first uplink communications resources 522. At time t11, the communications device transmits the second MAC TB 536 comprising the first data 506 and the second data 508 using the second uplink communications resources 528.

It will be appreciated that, in accordance with the conventional LCP scheme, higher priority data (specifically the third data 510 and fourth data 512) may be transmitted prior to lower priority data, even though the higher priority data was made available for transmission and triggered the transmission of an SR later than the lower priority data.

In the example of FIG. 5, the first uplink communications resources 522, allocated by the earlier-transmitted first DCI 518, start prior to the start of the second uplink communications resources 528, allocated by the later-transmitted second DCI 524. As such, the allocated communications resources occur in the same order as the respective DCIs in which their allocation was indicated.

However, it has been proposed that communications resources allocated by a sequence of two or more DCIs need not occur in the same order as the transmission order of the corresponding sequence of DCIs.

Figure 6:
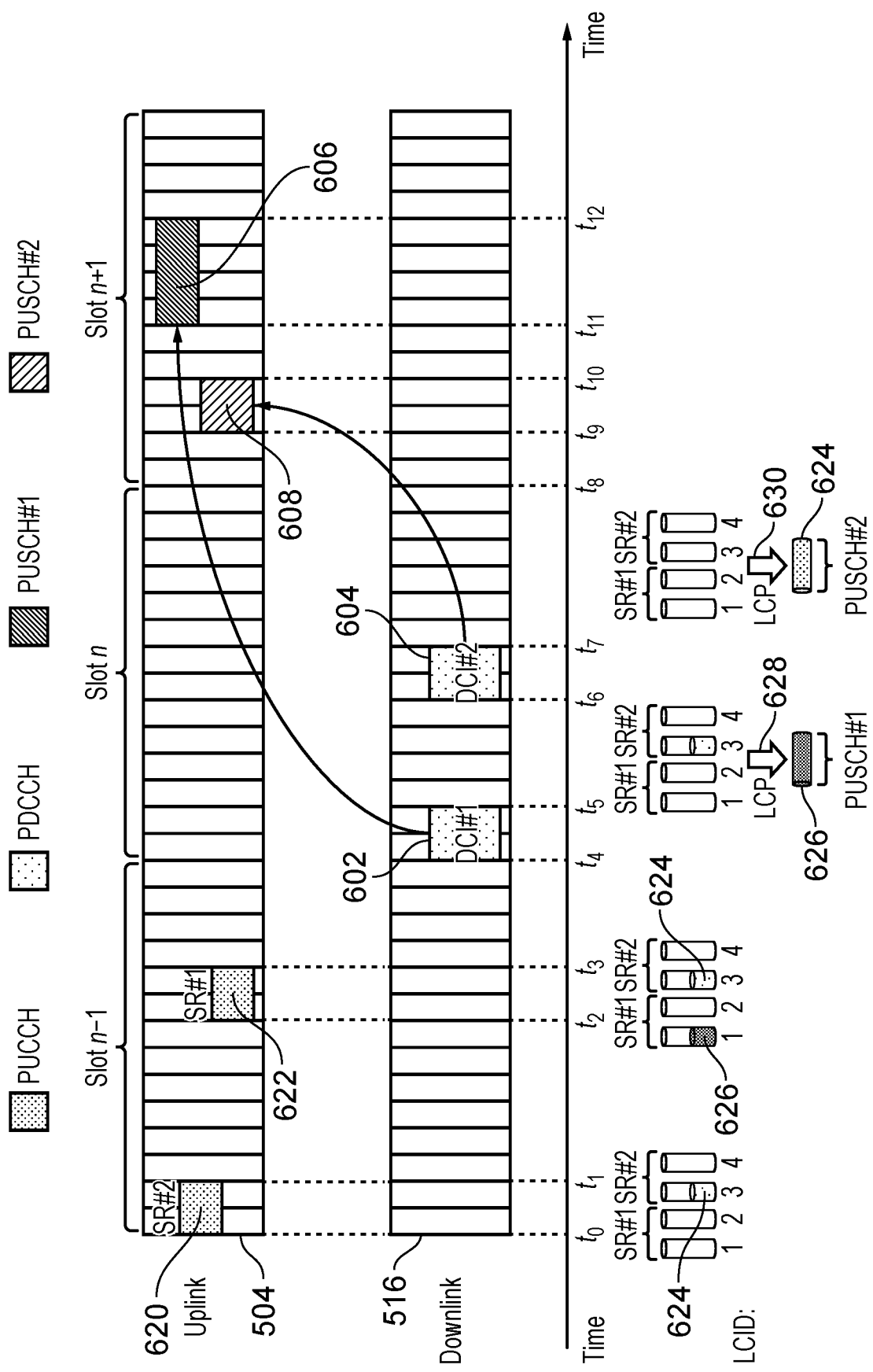
FIG. 6 illustrates a sequence of transmissions and corresponding allocated communications resources in accordance with a suggested scheme.

An example of such a scenario is illustrated in FIG. 6.

FIG. 6 illustrates a sequence of transmissions and corresponding allocated communications resources in accordance with a suggested scheme.

FIG. 6 shows first and second SRs 620, 622 transmitted at times t0 and t2 respectively in response to a corresponding determination by the communications device 104 that it has data available for transmission. Specifically, the first SR 620 is transmitted in response to determining that first data 624 associated with LCID 3 is available. The second SR 622 is transmitted in response to determining that second data 626 associated with LCID 1 is available. As in the example of FIG. 5, data associated with LCID 3 has lower priority than data associated with LCID 1.

First and second DCI 602, 604 are transmitted by the infrastructure equipment 101 starting at time t4 and time t6 respectively.

The first DCI 602 comprises an indication of first allocated uplink communications resources 606 which start at time t11. The second DCI 604 comprises an indication of second allocated uplink communications resources 608 which start at time t9 and finish at time t10, prior to time t11.

The first and second DCIs 602, 604 are transmitted in response to the first SR 620 and the second SR 622.

Because the second SR 622 is transmitted using resources associated with SR ID 1, which is associated with LCIDs 1 and 2, these being associated with low latency and high reliability requirements, the infrastructure equipment allocates the second communications resources 608 accordingly.

For example, the second communications resources 608 may extend over a relatively short duration and may start relatively soon after the transmission of the second DCI 604. In particular, the second communications resources 608 may start before the first communication resources 606. Additionally or alternatively, the second DCI 604 may indicate that data transmitted using the second communications resources 608 is to be encoded using modulation and coding scheme parameters which provide a relatively high degree of reliability. The second communications resources 608 may thus be particularly suitable for such low latency and/or high reliability data.

Similarly, the first communications resources 606 allocated in the first DCI 602, transmitted in response to the first SR 620, may be suitable for data associated with the LCIDs 3 and 4.

However, it has been appreciated by the inventors of the present techniques that according to a conventional approach, if the low latency, high reliability data is associated with a high priority then the communications device 104 will select that data for inclusion in a MAC TB formed in response to the reception of the first (earlier) DCI 602, which may allocate communications resources which are less suitable for the transmission of such data.

Similarly, the communications device 104 may select for inclusion in a MAC TB to be transmitted using the second communications resources 608 data for which the second communications resources 608 are not well-suited.

This is illustrated in FIG. 6, which shows a first LCP instance 628 in which relatively high priority second data 626 is initially selected for transmission using the first communications resources 606, while lower priority first data 624 is subsequently selected by a second LCP instance 630 for transmission using the second communications resources 608. In particular, where the second communications resources 608 are allocated in response to the second scheduling request 622 indicating that high priority (and low latency) data is available, the second communications resources 608 may provide for a low latency transmission of the high priority data. However, in accordance with the conventional techniques, the high priority data incurs significantly higher latency because it is selected for transmission using the (later) first communications resources 606.

Figure 7:
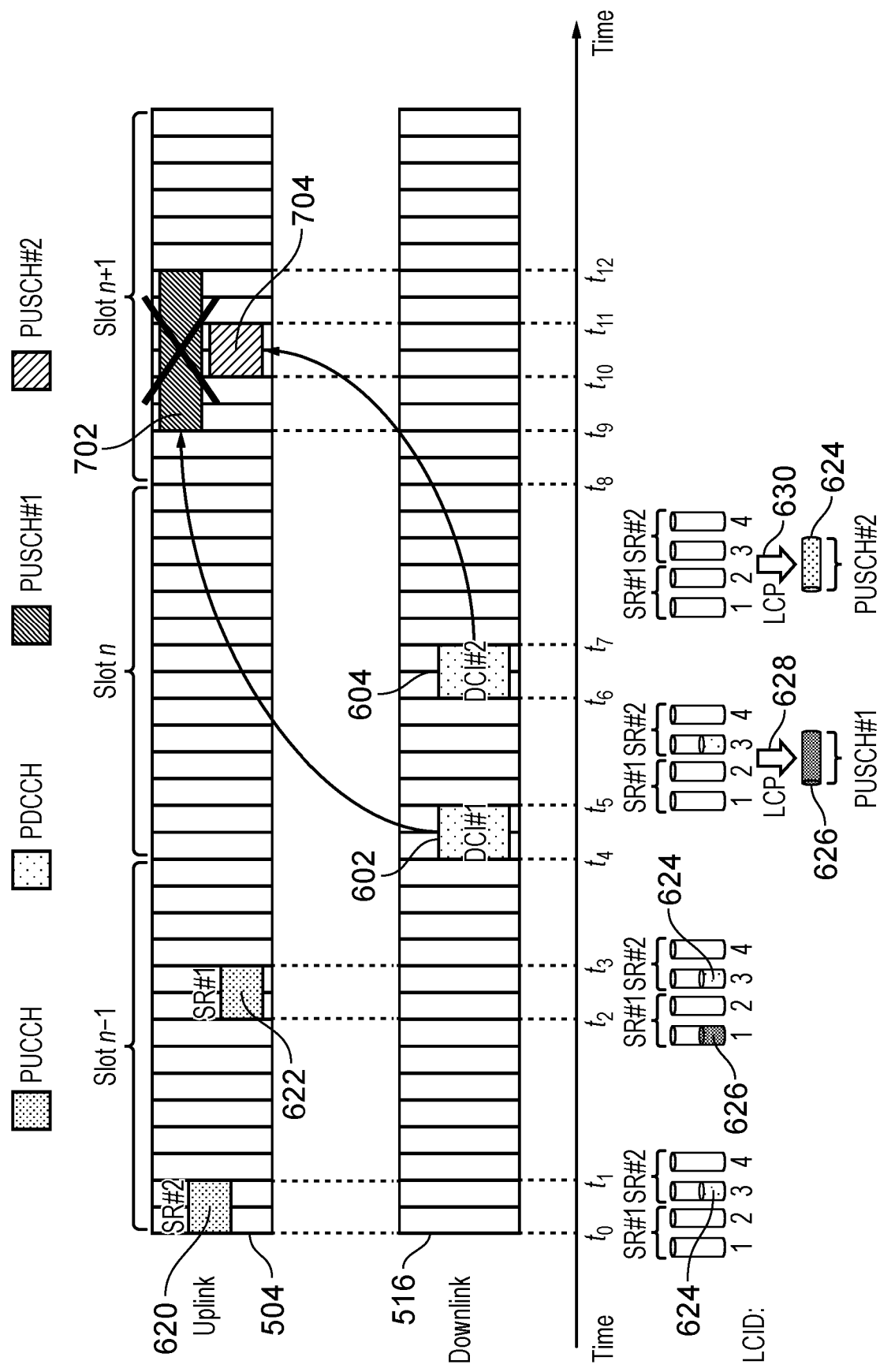
FIG. 7 illustrates a further possible sequence of transmissions and corresponding allocated communications resources in accordance with a suggested scheme.

A further problem with the conventional LCP scheme is illustrated in FIG. 7. The situation in FIG. 7 is similar to that in FIG. 6, and only differences will be described for conciseness.

In the example scenario of FIG. 6, the second communications resources 608 preceded in time, and did not overlap, the first communications resources 606.

By contrast, in the example of FIG. 7, second communications resources 702 allocated by the first DCI 602 overlap in time with first communications resources 704 allocated by the second DCI 604.

In the example of FIG. 7, the communications device 104 is considered to be incapable of transmitting using both the first and second communications resources 702, 704. In accordance with a proposed technique for ensuring predictable behaviour by the communications device 104 in such situations, the communications device 104 refrains from transmitting using those communications resources which were allocated by the earlier-transmitted DCI. Thus, in the example of FIG. 7, in accordance with such technique, the communications device 104 does not transmit using the first communications resources 702 (as indicated by the 'X' superimposed on the resources) and transmits only using the second communications resources 704.

When combined with the conventional LCP scheme described above, this may result in lower priority data (specifically, the first data 624) being successfully transmitted, while the higher priority second data 626 is not successfully transmitted. This problem may arise where the communications device 104 is unable to transmit using one of the first and second communications resources for any reason. For example, the communications device 104 may be constrained in processing capacity for carrying out the LCP instances required and encoding and modulating the resulting MAC TBs, such that it is not capable of transmitting both MAC TBs using the allocated communications resources.

In some embodiments of the present technique, the communications device, on receiving an allocation of uplink communications resources for transmitting data, selects an LCP scheme from a plurality of LCP schemes. The communications device 104 then selects data for transmission using the allocated uplink communications resources in accordance with the selected LCP scheme.

Figure 8:
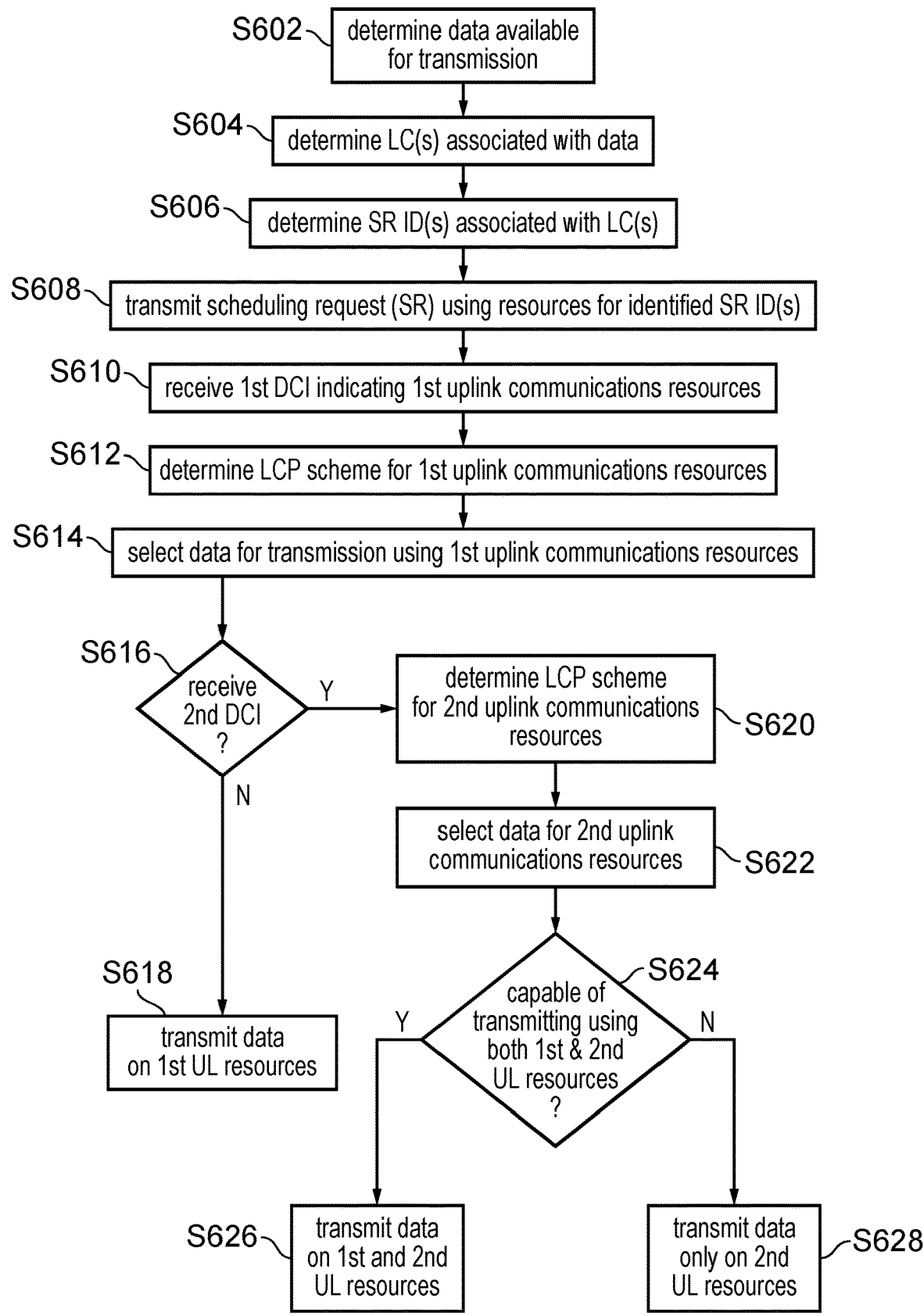
FIG. 8 illustrates a process for the selection of data for transmission in accordance with embodiments of the present technique.

FIG. 8 illustrates a process for the selection of data for transmission in accordance with embodiments of the present technique.

The process illustrated in FIG. 8 starts at step S602 in which the communications device 104 determines that it has data to transmit.

At step S604 the communications device 104 determines one or more logical channels which are associated with the data. In step S606, the communications device 104 determines one or more scheduling request IDs (SR IDs) associated with the logical channels identified in step S604.

In response to the determination at step S606, the communications device 104 determines communications resources for transmitting a scheduling request (SR) based on the identified SR IDs. The communications device at step S608 transmits the scheduling request using the identified resources.

In some embodiments, steps S604 and S606 may be omitted, and the transmission of the SR in step S608 may be without regards to the logical channels and/or any SR ID associated with the data referred to in step S602.

Subsequently at step S610, the communications device 104 receives a downlink control information (DCI) which comprises an indication of first uplink communications resources allocated for the transmission of data by the communications device 104.

At step S612 the communications device 104 determines a logical channel prioritisation (LCP) scheme for selecting the data to be transmitted using the communications resources allocated by the downlink control information received at step S610.

As described above, an LCP scheme may generally provide for the selection of data from one or more of a plurality of logical channels, in accordance with a prioritisation scheme. For example in accordance with an LCP scheme, the communications device 104 may be required to select data using a highest priority first algorithm, in which data is selected from logical channels having the highest priority first, and if, having selected all of the data having the highest priority, there remains space available in the uplink communications resources then the communications device 104 may select further data having lower priority, and so on.

Accordingly in step S614, the communications device 104 selects data for transmission using the first uplink communications resources in accordance with the LCP scheme determined at step S612. The selected data may be formed into a MAC transport block (TB), whose size may be determined in accordance with conventional techniques. For example, the size of the MAC TB may be determined based on the quantity of first uplink communications resources indicated by the DCI and based on modulation and coding scheme parameters which may be determined based on an indication within the DCI.

In some example scenarios, the communications device 104 may receive subsequent downlink control information (DCI) providing an indication of further uplink communications resources for the transmission of data by the communications device.

Thus in some embodiments, at step S616, the communications device 104 determines whether it has received a second downlink control information allocating second communications resources. In particular, the communications device 104 may carry out step S616 at any time, or repeatedly, between receiving the first DCI at step S610, and the start of the communications resources allocated by that DCI.

If no further DCI is received, then control passes to step S618, and the communications device 104 transmits the data selected in step S614 using the communications resources allocated in the first DCI received at step S610.

If at step S616 the communications device 104 determines that it has received a second DCI then control passes to step S620 in which the communications device 104 determines a second LCP scheme for selecting data for transmission using the second uplink communications resources. The second LCP scheme may be the same as, or different from, the LCP scheme determined in step S612.

In step S622 the communications device 104 selects data for transmission using the second uplink communications resources in accordance with the LCP scheme determined at step S620.

Subsequently at step S624, the communications device 104 determines whether it is capable of transmitting both using the first communications resources allocated in the DCI received at step S610 and using the second communications resources allocated by the second DCI received at step S616. The communications device 104 may not be able to transmit using both communications resources, if, for example the communications resources overlap in time and the communications device 104 is not capable of transmitting on two sets of communications resources which overlap in time.

In some embodiments, the communications device 104 may be unable to transmit on both the first and second communications resources due to processing constraints. For example the communications device 104 may not be capable of forming a MAC transport block for transmission using each of the first and second communications resources prior to the start of the respective communications resources.

If at step S624 the communications device 104 determines that it is capable of transmitting on both first and second communications resources then control passes to step S626 in which it transmits the data selected at step S622 using the second communications resources, and the data selected at step S614 using the communications resources allocated in the first DCI.

If at step S624 it is determined that it is not possible to transmit on both the first and second communications resources then control passes to step S628, in which the communication device refrains from transmitting using the first communications resources and transmits the data selected at step S622 using the second communications resources.

According to some embodiments of the present technique, a particular LCP scheme may be characterised by an association with a particular scheduling request group. A scheduling request (SR) group may be identified by an SR ID, and may be associated with one or more logical channels.

Figure 9:
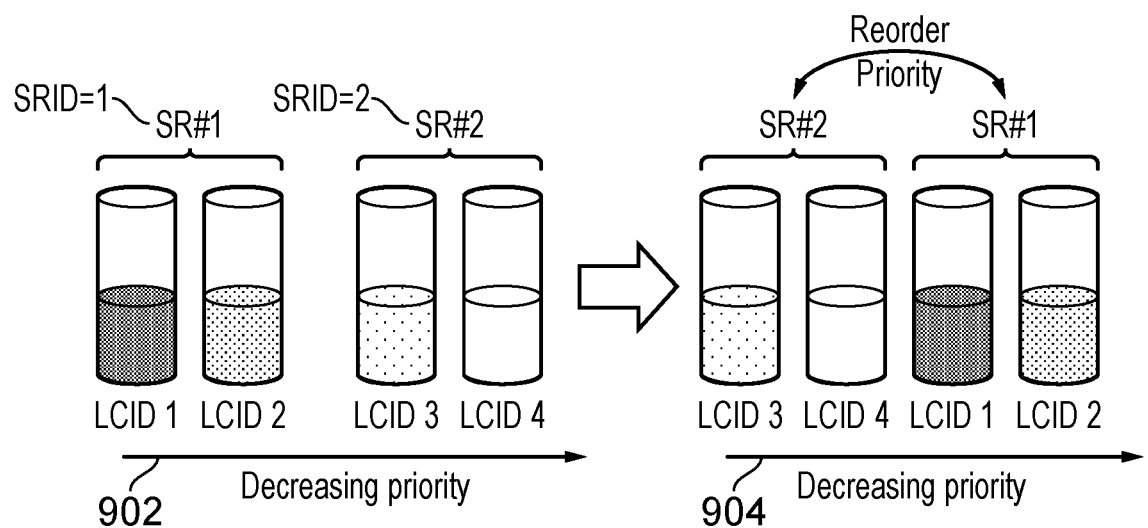
FIG. 9 illustrates an association of logical channels to scheduling request (SR) identities (ID), and an example of a logical channel prioritisation scheme associated with an SR ID in accordance with embodiments of the present technique.

FIG. 9 illustrates an association of logical channels to SR IDs, and an example of a logical channel prioritisation scheme associated with an SR ID number 2.

FIG. 9 shows four logical channels, associated with respective LCIDs 1 to 4 which are associated with one of two SR groups, having SR ID values of SR ID 1 and SR ID 2. In the example of FIG. 9, the logical channels having LCID equal to 1 and 2 are associated with SR ID 1, and logical channels having LCID 3 and LCID 4 are associated with SR ID 2.

The arrow 902 going from left to right indicates decreasing priority of logical channels, as configured by, for example, RRC signalling. That is, the logical channel having the highest priority is the logical channel having LCID 1, or the logical channel having the lowest priority is the channel having LCID 4. The prioritisation shown on the left side of FIG. 9 may be the prioritisation used in accordance with a default or conventional LCP scheme.

In some embodiments an LCP scheme may be characterised by a particular SR ID. For example, in the example of FIG. 9, an LCP scheme associated with an SR ID of 2 is shown on the right hand side. According to this LCP scheme, logical channels associated with the SR ID value of 2 are prioritised, having a higher priority than all other logical channels. As such, according to this LCP scheme, logical channels having LCID values of 3 and 4 are associated with a higher priority than logical channels having LCID values of 1 and 2. The decreasing order in accordance with the LCP scheme indicated on the right side of FIG. 9 is shown by the arrow 904.

Figure 10:
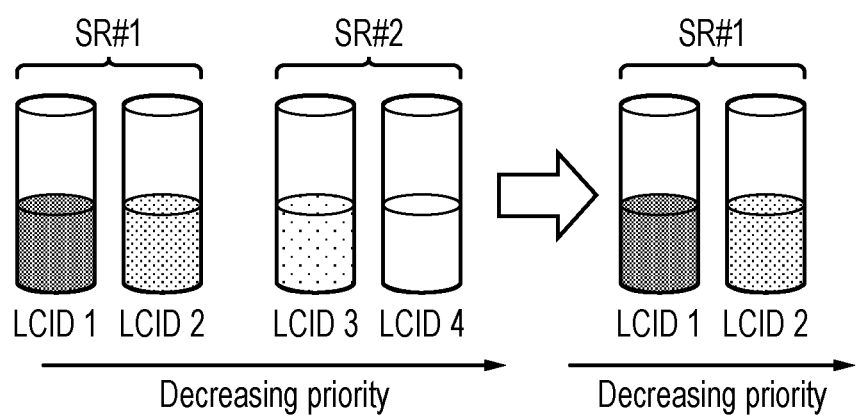
FIG. 10 illustrates a further example of a logical channel prioritisation (LCP) scheme in accordance with some embodiments of the present technique.

FIG. 10 illustrates a further example of determining a logical channel prioritisation scheme in accordance with some embodiments of the present technique. In the example of FIG. 10 the logical channel prioritisation scheme is again associated with an SR ID.

The logical channel prioritisation scheme shown on the right side of FIG. 10 is one associated with the SR ID value of 1. According to the LCP scheme, only data associated with logical channels whose LCID values are associated with the SR ID corresponding to the LCP scheme may be selected for transmission.

Thus as shown in FIG. 10 only data associated with logical channels having an LCID value of 1 and 2 may be selected, while data associated with LCID 3 and LCID 4, being associated with SR ID 2, may not be selected for transmission.

Thus, in some embodiments of the present technique an LCP scheme may be characterised by being associated with a particular scheduling request group and thus SR ID.

In some embodiments, an LCP scheme may not be associated with a particular SR ID. For example, the communications device 104 may be configured with a plurality of prioritisation orders for the plurality of logical channels, each LCP scheme being characterised by a particular prioritisation order.

For example, according to a first LCP scheme, the logical channels LCID 1-4 shown in FIG. 9 may be prioritised in the order (of decreasing priority): LCID1, LCID2, LCID3, LCID4. According to a second LCP scheme, the logical channels may be prioritised in the order (of decreasing priority): LCID3, LCID4, LCID1, LCID2. According to a third LCP scheme, the logical channels may be prioritised in the order (of decreasing priority): LCID2, LCID3, LCID4, LCID1.

In another example, only a subset of logical channels are considered in the LCP as in FIG. 10.

Accordingly, for example, at step S612 of the process of FIG. 8, the communications device 104 may select one from a plurality of predetermined logical channel prioritisation orders, such as from the first, second and third LCP schemes described above.

In some embodiments, an LCP scheme may be characterised by one or more logical channels being assigned as 'highest priority', and thereby having (for the purposes of the LCP scheme) higher priority than those configured as having highest priority (for the purposes of, for example, a 'default' LCP scheme). For example, an LCP scheme may be characterised by assigning LCID 3 as having the highest priority, followed by the other logical channels in decreasing order of their configured priority.

In some embodiments of the present technique, in accordance with an LCP scheme, data is retained for a time period after it has been selected for inclusion in a first MAC TB, such that it remains a candidate for subsequent selection for inclusion in a second MAC TB.

In some such embodiments, the retained data is retained until the first MAC TB is transmitted.

In some embodiments, only data associated with a predetermined LCID and/or SR ID associated with the LCP scheme is retained.

Figure 11:
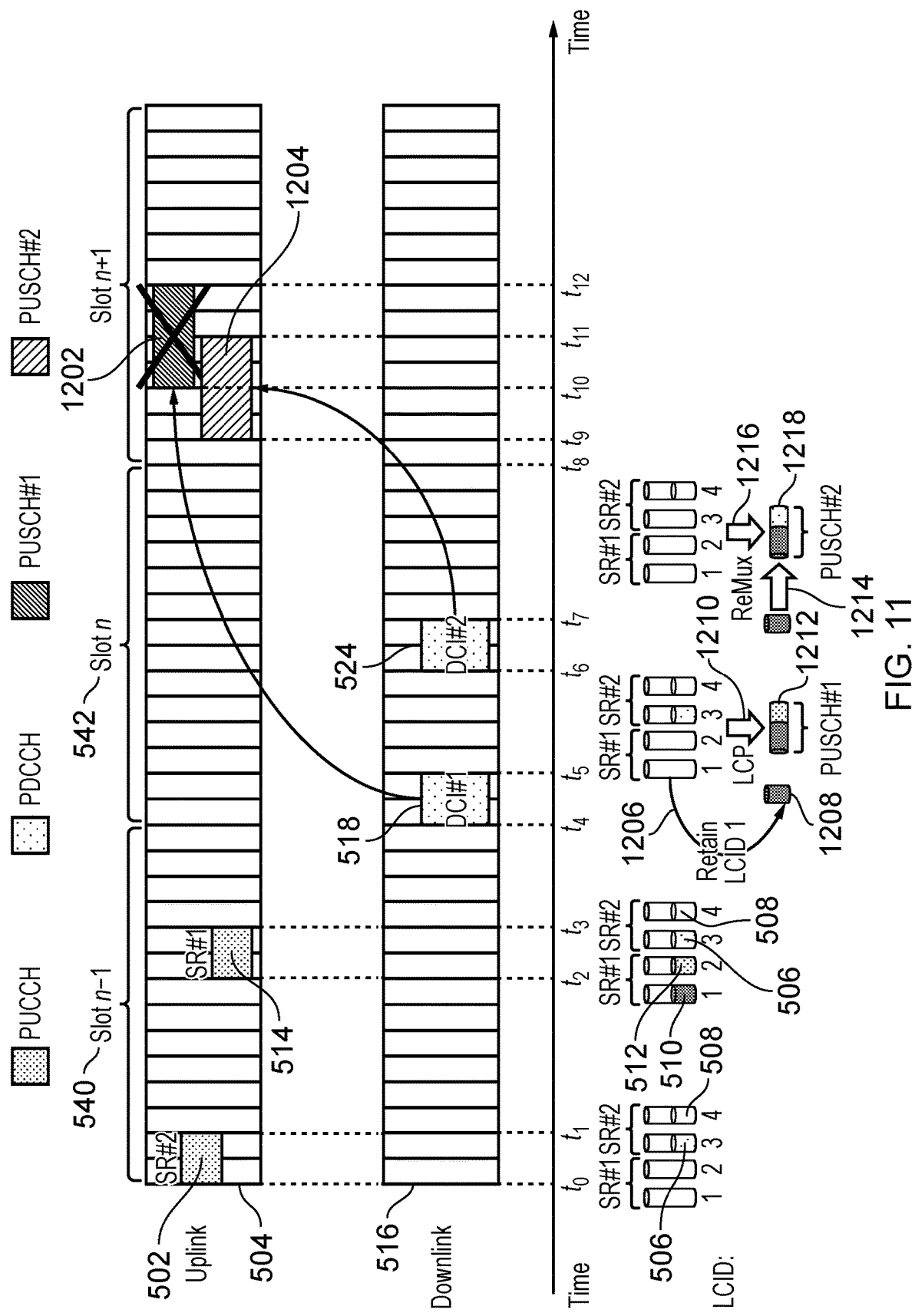
FIG. 11 illustrates an LCP scheme in accordance with embodiments of the present technique whereby data is retained as a candidate for selection after it has been previously selected.

FIG. 11 illustrates an LCP scheme in accordance with embodiments of the present technique whereby data is retained as a candidate for inclusion in a MAC TB after it has been selected for inclusion in an earlier-formed MAC TB.

The example of FIG. 11 is similar to the example illustrated in FIG. 5 and described above, and for conciseness, description of common aspects will be omitted.

In response to receiving the first DCI 518, the communications device 104 selects data for inclusion in a first MAC TB 1212 for transmission in the first communications resources 1202 allocated by the first DCI 518. This selection of data is in accordance with a first LCP scheme 1210, which is characterised by the retention of any data associated with LCID1 which is selected for inclusion in the first MAC TB 1212.

In accordance with the first LCP scheme 1210, data is selected in accordance with the configured priorities associated with each of the LCIDs 1-4, as illustrated on the left hand side of FIG. 9 and FIG. 10.

In addition, in accordance with the first LCP scheme 1210, data 1208 associated with LCID1 which is selected for inclusion in the first MAC TB 1212 is retained for subsequent selection, as indicated by the arrow 1206. In the example of FIG. 11, all of the third data 510 is associated with LCID1 and is selected for inclusion in the first MAC TB 1212. Therefore, the data 1208 corresponds to the third data 510.

Subsequently, in response to receiving the second DCI 524, the communications device 104 selects a second LCP scheme 1216 for selecting data for inclusion in a second MAC TB 1218 for transmission using the second communications resources 1204 allocated by the second DCI 524.

According to the second LCP scheme 1216, data is selected in accordance with the configured priorities associated with each of the LCIDs 1-4, as illustrated on the left hand side of FIG. 9 and FIG. 10. In addition, in accordance with the second LCP scheme 1216 any data previously retained, such as in accordance with the first LCP scheme 1210 is considered as a candidate for selection, in accordance with the same priorities. In accordance with the first LCP scheme 1210, the retained data 1208 remains available for subsequent selection because the first MAC TB 1212 for which it was selected has not in fact been transmitted; in other words, the second LCP scheme 1216 is being implemented between time t7 and time t10, when the first communications resources 1202 start. Thus, the retained data 1208, being associated with LCID1 and therefore having the highest priority among the data available for selection, is selected as indicated by the arrow 1214. There being additional space in the second MAC TB 1218, first data 506 (having the highest priority of the remaining data available for selection) is also included in the second MAC TB 1218.

In some embodiments, the first and second LCP schemes 1210, 1216 may be the same LCP scheme, in the sense that both may comprise the retaining of any data associated with one or more predetermined LCIDs selected for a current MAC TB, and the consideration of previously-retained data for inclusion in the current MAC TB.

In some embodiments, in accordance with the first LCP scheme 1210 and/or the second LCP scheme 1216, any data retained after performing LCP in response to receiving the first DCI 518 may be selected for subsequent inclusion in a MAC TB only if the second DCI 524 is received prior to the end of the first uplink communications resources 1202.

In some embodiments, in accordance with the first LCP scheme 1210 and/or the second LCP scheme 1216, any data retained after performing LCP in response to receiving the first DCI 518 may be selected for subsequent inclusion in a MAC TB only if the second uplink communications resources 1204 begin prior to the end of the first uplink communications resources 1202. In the example of FIG. 11, because the communications device 104 is not capable of transmitting using both the first and second communications resources 1202, 1204, then the communications device 104 refrains from transmitting using the first communications resources 1202, because these were allocated by the first DCI 518 which was received prior to the reception of the second DCI 524 allocating the second communications resources 1204.

Nevertheless, because of the retention of the third data 510, and its subsequent inclusion in the second MAC TB 1218 which is transmitted, the third data 510 is in fact transmitted.

In some embodiments, in accordance with conventional HARQ techniques, data selected for a MAC TB which was not in fact transmitted (for example, because of overlapping allocated communications resources) will be transmitted.

In the example of FIG. 11, this may mean that the first MAC TB 1212 will be retransmitted, resulting in redundant transmission of third data 510 which was additionally transmitted within the second MAC TB 1218. In order to mitigate this, in some embodiments, the infrastructure equipment may determine that the first MAC TB 1212 included data which was also transmitted within the second MAC TB 1218, and in response, indicate to the communications device 104 that no further transmission of the first MAC TB 1210 is to be carried out.

In some embodiments, where a retransmission of the first MAC TB 1212 is expected by the infrastructure equipment, the communications device 104 may perform a fresh selection of data in accordance with a selected LCP scheme to form a third MAC TB, the third MAC TB being transmitted using communications resources allocated for the purpose of a retransmission of the first MAC TB 1212. In such embodiments, redundant transmission of the third data 510 may be avoided.

As described above, in some embodiments of the present technique, the selected LCP scheme is associated with an SR ID.

Figure 12:
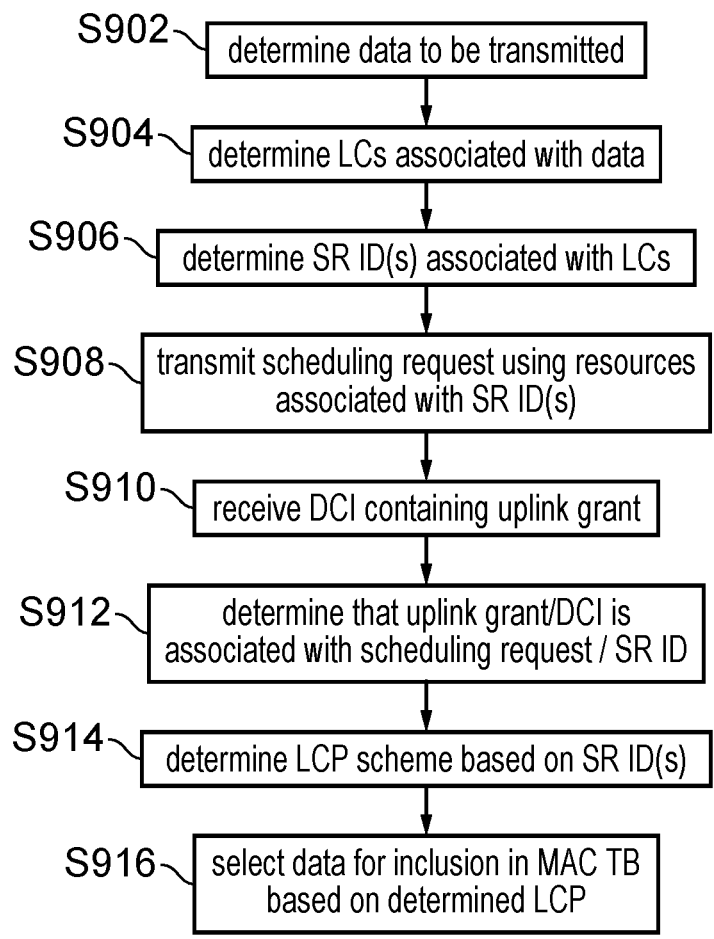
FIG. 12 illustrates a process for the selection of data in accordance with embodiments of the present technique.

FIG. 12 illustrates a process for the selection of data in accordance with embodiments of the present technique, where the process comprises determining an SR ID associated with control information indicating allocated uplink communications resources.

The process of FIG. 12 starts at step S902 in which it is determined by the communications device 104 that data is available to be sent. At step S904, the communications device 104 determines the logical channels associated with the data.

At step 906, the communications device 104 determines the one or more SR IDs associated with the respective logical channels identified at step 904. As described above, the SR ID is associated with pre-determined communications resources on the uplink of the wireless access interface which may be used for transmitting a scheduling request.

By transmitting the scheduling request using the resources which are predetermined and associated with a particular SR ID, the communications device 104 may indicate to the infrastructure equipment of the wireless network which SR ID, and hence which logical channel(s), it is requesting communications resources for. Thus at step S908, the communications device 104 transmits a scheduling request using the pre-determined communication resources associated with the SR ID determined at step S906.

Subsequently, at step S910, the communications device 104 receives downlink control information (DCI) comprising an information of uplink communication resources for the transmission of data by the communications device 104.

At step S912, the communications device 104 determines that the uplink grant received at step S910 is associated with a particular SR ID. The process for determining the association between the uplink grant and the SR ID will be explained in further detail below.

Based on the SR ID which is determined at step S912 to be associated with the uplink grant, and thus with the uplink communication resources allocated by the infrastructure equipment, the communications device 104 determines the LCP scheme associated with the SR ID determined at step S912. Examples of LCP schemes which may be associated with the SR ID are illustrated in FIG. 9 and FIG. 10 and are described above.

At step S916 the communications device 104 forms a MAC TB comprising data in accordance with the LCP scheme associated with the SR ID determined at step S914. In particular, the selected data may or may not comprise the data referred to in step S902 above. If, for example, further data has become available for transmission in the meantime, and/or the selected LCP scheme otherwise precludes the selection of this data, then the selected data may not include that referred to in step S902 above.

In embodiments of the present technique, the LCP scheme to be used for selecting data for transmission using uplink communications resources is selected in response to receiving downlink control information (DCI) indicating the allocation of the uplink communications resources.

In some such embodiments, the LCP scheme is selected based on the DCI contents.

In some embodiments, the LCP scheme is selected based on a radio network temporary identity (RNTI) which is incorporated (for example, by means of logical XOR) within error detection bits of the DCI. For example, once the contents of the DCI are formed, a cyclic redundancy check (CRC) is performed based on the contents of the DCI, and the output of the CRC is scrambled by an RNTI and appended to the DCI contents by the infrastructure equipment. Accordingly, the communications device 104 decodes the DCI contents, performs the same CRC calculation and determines the RNTI which was selected by the infrastructure equipment 101, and, on the basis of the determined RNTI, selects the LCP scheme.

In some such embodiments, each of a plurality of RNTI values are associated with a particular LCP scheme. For example:

RNTI #1: Only those LCIDs associated with SR #1 (having SRID1) are used for LCP

RNTI #2: Only those LCIDs associated with SR #2 (having SRID2) are used for LCP

RNTI #3: All LCIDs are used for LCP, i.e. a 'default' or conventional LCP is used FIG. 13 illustrates an example of selection of an LCP scheme based on an RNTI encoded within a DCI in accordance with some embodiments of the present technique.

Figure 13:
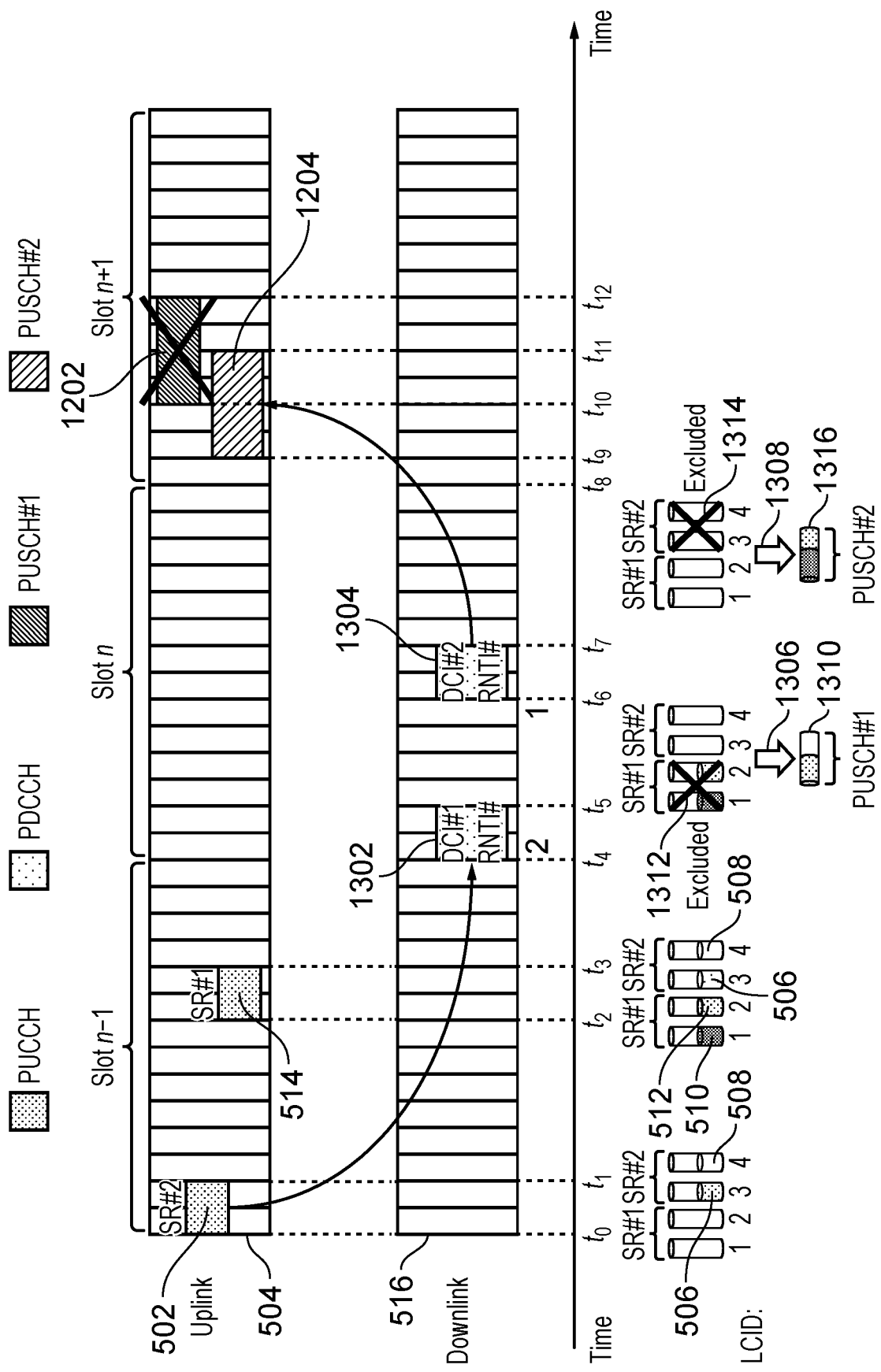
FIG. 13 illustrates an example of selection of an LCP scheme based on an identifier encoded within downlink control information (DCI) in accordance with some embodiments of the present technique.

Many aspects of FIG. 13 are similar to those in FIG. 11, and a description of common features will be omitted for conciseness.

In the example of FIG. 13, the first DCI 1302 has, encoded within error checking bits as described above, a first RNTI value (RNTI #2). In response to receiving the first DCI 1302, the communications device 104 selects the LCP scheme 1306 associated with RNTI #2, according to which only LCIDs associated with SRID2 are used for LCP. In accordance with the configured association between LCID values and SRID values, only data associated with LCIDs 3 and 4 may be selected for inclusion in the first MAC TB 1310, as indicated by the X 1312 superimposed on the data buffers holding data associated with LCIDs 1 and 2. The communications device 104 therefore selects the first data 506 and the second data 508 for inclusion in the first MAC TB 1310.

The second DCI 1304 has, encoded within error checking bits, a second RNTI value (RNTI #1). In response to receiving the first DCI 1304, the communications device 104 selects the LCP scheme 1308 associated with RNTI #1, according to which only LCIDs associated with SRID1 are used for LCP. In accordance with the configured association between LCID values and SRID values, only data associated with LCIDs 1 and 2 may be selected for inclusion in the second MAC TB 1316, as indicated by the X 1314 superimposed on the data buffers holding data associated with LCIDs 3 and 4. The communications device 104 therefore selects the third data 510 and the fourth data 512 for inclusion in the second MAC TB 1316.

As in the example of FIG. 11, the communications device 104 may not transmit using the first communications resources 1202. Nevertheless, embodiments of the present technique permit the infrastructure equipment to ensure that each DCI allocates resources which are appropriate for the data (and its corresponding quality of service requirements) which will be transmitted using the resources allocated by that DCI.

Furthermore, if a DCI is transmitted which allocates resources which conflict with resources allocated by an earlier DCI, the infrastructure equipment may ensure that higher priority data is transmitted by appropriately setting the RNTI used to transmit the later DCI to correspond to an LCP scheme whereby high priority data is selected for the MAC TB.

It should be appreciated that although in this example only 3 RNTIs are used, the present disclosure is not so limited, and any number of RNTIs may be used to indicate an LCP scheme. In some embodiments, an RNTI can be associated with more than one SR ID.

In some embodiments, a format of the DCI implicitly indicates one or more LCIDs or one or more SR IDs and hence a particular LCP scheme. For example, the communications device 104 may be configured to monitor two different DCI formats, which may be the same size or different sizes. Each monitored DCI format is associated with a different SR ID and thus a different LCP scheme.

For example, in the example of FIG. 13, the first DCI 1302 may use a DCI format that is associated with SR #2 to indicate the LCP scheme 1306 and the second DCI 1304 may use another DCI format that is associated with SR #1 and thus with the LCP scheme 1308.

In some embodiments the LCP scheme is indicated by (and thus determined based on) a set of physical resources (such as a CORESET) used to carry the PDCCH in which the DCI is transmitted. The CORESET is a set of physical resources used for PDCCH, and different CORESETs can be configured for a given communications device.

For example, a set of frequency and time resources corresponding to CORESETs may be associated with an SR ID by means of, for example, RRC configuration. For example, two different CORESETs, denoted CORESET #1 and CORESET #2 (each using different frequency & time resources) may be configured for the communications device. In the example of FIG. 13, the first DCI 1302 may be transmitted using the resources of CORESET #2 which is associated with SR #2, and thus indicating the first LCP scheme 1306 by which only LCIDs 3 and 4 may be considered for selection, and preventing data associated with LCIDs 1 and 2 from being considered for transmission using the first communications resources 1202. Similarly, the second DCI 1304 may be transmitted in CORESET #1 which is associated with SR #1 and accordingly indicates the second LCP scheme 1308.

The DCI may be transmitted using one of a plurality of PDCCH candidates within a PDCCH search space. A PDCCH candidate is defined by its location within frequency-time resources within a PDCCH search space and may be characterised by one or more control channel elements (CCE) and by the number (which may be referred to as an Aggregation Level, AL) of CCEs used for the transmission of the DCI.

In some embodiments the LCP scheme is indicated by (and thus determined based on) the PDCCH candidate used for the transmission of the DCI. In some embodiments the LCP scheme is indicated by the PDCCH search space (i.e. a set of PDCCH candidates). For example, a set of PDCCH candidates may be associated with a particular LCP scheme being associated with a first SRID (e.g. SRID 1). In some embodiments, the aggregation level associated with the PDCCH candidate used for the transmission of the DCI is associated with a particular LCP scheme; for example, an AL=16 indicates an LCP scheme associated with SRID 2.

The DCI may comprise an indication of modulation and coding scheme parameters to be used by the communications device 104 when transmitting data using the uplink communications resources indicated in the DCI. For example, the DCI may comprise an indication of an MCS Index, which corresponds to a row of parameters in a pre-determined table of modulation and coding scheme parameters. In some embodiments the LCP scheme is indicated by (and thus determined based on) the modulation and coding scheme parameters indicated by the DCI. For example, in some embodiments, modulation and coding schemes providing a reliability or coding rate which exceeds a pre-determined threshold is associated with a first LCP scheme. In some embodiments, modulation and coding schemes providing a reliability or coding rate which is below a pre-determined threshold is associated with a second LCP scheme.

In some embodiments, the communications device 104 and the infrastructure equipment 101 determine an 'average MCS', corresponding to a reliability or coding rate which is based on a plurality of previously-indicated modulation and coding parameters, and the pre-determined threshold is determined based on the 'average MCS'. In other words, a threshold used to determine whether a particular LCP scheme is indicated is adapted dynamically based on previous transmissions and/or resource allocations. As described above, the particular LCS scheme may be associated with one or more LCIDs and/or one or more SRIDs.

In some embodiments, the pre-determined threshold is dynamically updated and is based on recent radio conditions applicable to transmissions on the wireless access interface between the communications device 104 and the infrastructure equipment 101. In some embodiments, only uplink radio conditions are considered. Radio conditions may be evaluated based on an explicit indication transmitted by the infrastructure equipment 101 to the communications device 104. Alternatively or additionally, radio conditions may be determined based on downlink channel state information (CSI) where the wireless access interface is based on time division duplex.

Alternatively or additionally, radio conditions may be determined based on transmission power used by the communications device 104 for previous transmissions and/or a number of positive acknowledgements which have been received. Preferably, only radio conditions evaluated while the communications device 104 is in its current position are taken into account.

In some embodiments, the communications device 104 applies a first LCP scheme if the allocated MCS is within a first range with respect to current radio conditions. The first range may correspond to a range which may be used for, for example, eMBB data traffic transmissions. The communications device 104 may apply a second LCP scheme if the allocated MCS provides a reliability greater than any MCS falling within the first range. For example, such allocated MCS may be appropriate for URLLC data transmission.

The communications device 104 may monitor the average of previous MCS that it is assigned. The average MCS could be calculated using an finite impulse response (FIR) filter or averaging over a sliding window (e.g. average MCS is the mean of the 10 previous MCS values allocated to the UE). If the MCS assigned to the communications device 104 is less than the average MCS, it would indicate that the communications resources have been allocated for a high reliability service such as URLLC, having a corresponding high priority. The communications device 104 can then apply an LCP scheme that is particularly applicable to URLLC services.

This recognises that the reliability of a MCS depends on the radio condition such as signal to noise ratio (SNR). That is, a high MCS (providing a relatively high data rate) may be reliable if the SNR is good, whilst a medium MCS (providing relatively higher reliability, but at a lower overall data rate) can be unreliable if the SNR is poor. In some embodiments, the determination of an MCS can be based on the radio condition in the uplink.

In some embodiments the LCP scheme is indicated by (and thus determined based on) the value(s) of one or more power control parameters indicated by the DCI. The infrastructure equipment 101 may determine that first power control parameter values are suitable for data having low latency and high reliability requirements, such as URLLC data, while second power control parameter values are suitable for data having high bandwidth and weaker latency requirements, such as eMBB data.

Accordingly, the DCI may comprise an indication of the first power control parameters to indicate that the LCP scheme is to be one which provides preferential (or exclusive) selection of URLLC data, or may comprise an indication of the second power control parameters to indicate that the LCP scheme is to be one which provides preferential (or exclusive) selection of eMBB data.

In some embodiments there may be two or more sets of power control parameter values, and the DCI may comprise an indication of an applicable set of power control parameter values, selected from the two or more sets. Each set may be associated, by means of configuration of the communications device, with an LCP scheme, for example by being associated with a particular LCID or SR ID.

In some embodiments, each set of power control parameters may comprise open loop power control parameters such as a PO value and an alpha value. In some embodiments, each set of power control parameters may comprise closed loop power control parameters. The DCI may comprise a transmit power control (TPC) command directed to one of the sets of closed loop power control parameters. In some embodiments, the set of closed loop power control parameters to which the TPC command is directed may indicate (and thus be the basis for selection of) a particular LCP scheme. The indication of which closed loop power control parameters are the subject of the TPC command may comprise an SRS (Sounding Reference Signal) resource indicator (SRI).

In some embodiments, the wireless access interface provides communications resources which are organised in time into time units (which may be referred to as slots) and, within each slot, are further subdivided. For example, where the wireless access interface is based on orthogonal frequency division multiplexing (OFDM), each slot may be subdivided into OFDM symbol periods. The time period corresponding to the allocated uplink communications resources may be indicated within the DCI by means of different indication formats. Different indication formats may correspond to different restrictions in respect of the OFDM symbol period(s) within a timeslot on which the allocated uplink communications resources may start.

For example, according to a first format, the uplink communications resources may be constrained to begin either at a first OFDM symbol within a timeslot or at a fourth OFDM symbol within a timeslot. In some example embodiments, according to the first format, the uplink communications resources may be constrained to begin at a first OFDM symbol within a timeslot. According to a second format, the uplink communications resources may not be so constrained and may start at any timeslot within an OFDM symbol. In addition, in accordance with the first format only one PUSCH instance can be scheduled for a communications device within a timeslot, while for the second format one or more PUSCH instances can be scheduled for the same communications device within a timeslot. The first format may be more suitable for allocating resources for eMBB data. The second format provides greater flexibility in identifying the time period corresponding to the uplink communications resources, and may therefore be more suitable for allocating resources for lower-latency data such as URLLC data. The formats may be referred to as PUSCH resource mapping types, and the first format may be referred to as a Type A, and the second format may be referred to as a Type B.

For example, referring to FIG. 5, the time period from t9 to t10 associated with the first uplink communications resources 522 could not be indicated using the first format because t9 is not a boundary of a timeslot (t9 starts after the start of slot n+1, which starts at time t8) and is not starting at a fourth OFDM symbol of the timeslot. However, time t9 could be indicated using the second format.

In some embodiments, the LCP scheme is indicated by (and thus determined based on) a format used to indicate, within the DCI, the starting time of the allocated uplink communications resources. In some embodiments, the communications device 104 is configured with an association between a format (such as a PUSCH resource mapping type) and an LCP scheme. For example, the communications device 104 may be configured with an association between the Type B PUSCH resource mapping type and an LCID associated with URLLC data and/or a corresponding LCP scheme prioritising URLLC data. The communications device 104 may be configured with an association between the Type A PUSCH resource mapping type and an LCID associated with eMBB data and/or a corresponding LCP scheme which prioritises eMBB data.

In some embodiments, the LCP scheme is indicated by (and thus determined based on) a repetition level associated with the allocated uplink communications resources. In some such embodiments, if the DCI comprises an indication that the communications device 104 may, or shall, repeat the transmission of data using the indicated uplink communications resources then a first LCP scheme is selected. Additionally or alternatively, where the communications device 104 is not permitted or able (based on, for example, an indication in the DCI that the number of repetitions is equal to one or an allocation that implicitly indicates no repetition, or based on an absence of an indication of a number of repetitions) to repeat the transmission of data using the indicated uplink communications resources, a second LCP scheme is indicated.

In some embodiments, the LCP scheme is indicated by (and thus determined based on) a repetition level associated with the allocated uplink communications resources and a repetition threshold. In some embodiments, each of a plurality of LCP schemes may be associated (for example, by means of RRC configuration) with a repetition parameter, which may be a maximum repetition threshold or a minimum repetition threshold and which may be configured for each LCID.

In some such embodiments, the DCI may comprise an indication that the communications device 104 may, or shall, repeat the transmission of data using the indicated uplink communications resources a number of times, referred to herein as a 'DCI repetition number'.

If the DCI repetition number is equal to the repetition parameter of an LCP scheme, then that LCP scheme is selected.

In some embodiments, if the DCI repetition number is equal to or exceeds a minimum repetition threshold associated with an LCP scheme, then that LCP scheme is selected.

In some embodiments, if the DCI repetition number is equal to or below a maximum repetition threshold associated with an LCP scheme, then that LCP scheme is selected.

In some embodiments, the communications device 104 determines an LCP scheme by determining an association between the DCI triggering the LCP process and a previously-transmitted SR. In some such embodiments, where the previously-transmitted SR is associated with a particular SR ID, the LCP scheme is determined based on the SR ID associated with the previously-transmitted SR, for example using one of the techniques illustrated in FIG. 9 and FIG. 10 and described above.

In the following paragraphs, examples are provided by which the communications device 104 determines an association between a DCI and an SR ID.

Figure 14:
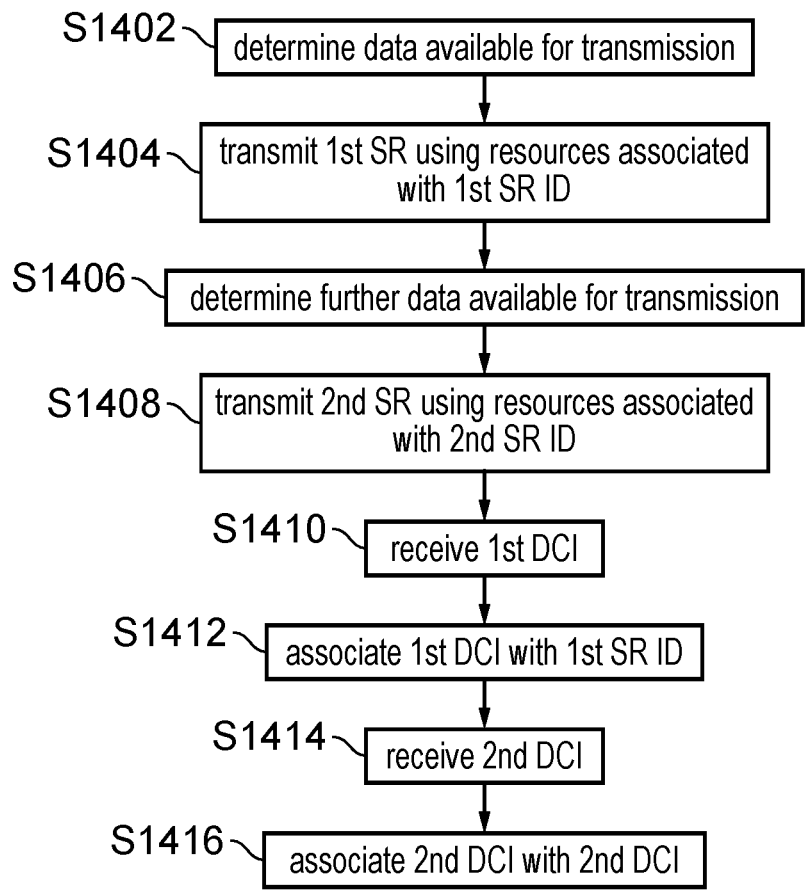
FIG. 14 is a flow chart for a process implemented by a communications device for associating an SR ID with a DCI in accordance with embodiments of the present technique.

FIG. 14 is a flow chart for a process implemented by a communications device for associating an SR ID with a DCI in accordance with embodiments of the present technique.

The process of FIG. 14 starts at step S1402 in which the communications device 104 determines that it has a first portion of data to transmit to the infrastructure equipment 101.

In response to this determination, at step S1404, the communications device determines the logical channel(s) associated with the data, and determines a first SR ID associated with the logical channel(s). The communications device 104 transmits a first SR using the uplink communications resources associated with the determined first SR ID value.

Subsequently at step S1406, the communications device 104 determines that is has further data to transmit to the infrastructure equipment 101.

At step S1408, in response to the determination at step S1406, the communications device 104 transmits a second SR using communications resources associated with a second SR ID associated with the logical channel(s) associated with the data identified at step S1406.

Subsequently, the communications device 104 receives a first DCI and a second DCI, transmitted by the infrastructure equipment 101 in response to the first SR and the second SR, respectively.

In step S1410, the communications device 104 receives the first DCI allocating first uplink communications resources. At step S1412 the communications device 104 associates the first DCI with SRID 1. This is done on the principle that the first DCI received in a sequence of received DCIs corresponds to the first SR transmitted in a corresponding sequence of scheduling requests. Since the first SR transmitted at step S1404 was associated with the first SR ID, then the first DCI, corresponding to the first SR, is accordingly determined to be associated with the first SR ID.

Similarly at step S1414, the communications device 104 receives the second DCI, and in step S1416, determines that the second DCI is associated with the second SR ID. In a similar manner to the determination at step S1412, the determination at step S1416 is based on the fact that the second DCI corresponds to the second SR transmitted at S1408, and thus the second DCI is associated with the second SR ID, being the SR ID value associated with the second SR.

In the example of FIG. 14 the transmission of only two SRs and the corresponding reception of only two DCIs is shown. However, it will be appreciated that the principle of the technique illustrated in FIG. 14 may be extended to any number of SRs and DCIs transmitted and received in sequence.

Referring to the sequence of transmissions illustrated in FIG. 13, it will be apparent that the process illustrated in FIG. 14 may be applied in the example of FIG. 13, wherein there is no need to indicate an associated SR ID value by means of an RNTI value associated with the first DCI 1302 or the second DCI 1304. As such, in the example of FIG. 13, the process of FIG. 14 could be carried out to determine that the first DCI 1302 is associated with SRID 2, and the second DCI 1304 is associated with the second SR 514, and thus with SRID 1, based on the sequence of the transmission of the first SR 502 and the second SR 514.

As described above, based on the determination of an SR ID associated with a DCI, the communications device 104 is able to select an LCP scheme based on the SR ID and accordingly to select data for inclusion in a MAC TB such as the first MAC TB 1310 and the second MAC TB 1316 shown in FIG. 13 in accordance with the respective selected LCP schemes.

In accordance with the process illustrated in FIG. 14, the communications device 104 is able to determine an LCP scheme in response to receiving a DCI, without any explicit or implicit indication in the DCI itself of the LCP scheme.

In some embodiments, the communications device 104 may associate one or more previously-transmitted SRs with a single DCI. Accordingly, the communications device 104 may determine that the LCP scheme is associated with a plurality of SR ID values. For example, referring to the technique illustrated in FIG. 10, in accordance with an LCP scheme associated with a plurality of SR ID values, data from all LCIDs associated with one of the plurality of SR ID values may be selected for transmission. Data which is associated with an LCID which is not associated with any of the plurality of SR ID values may be excluded from selection.

In some embodiments, if the communications device 104 determines that a DCI is associated with all configured SR ID values, the communications device 104 may determine that the LCP scheme is a 'default' LCP scheme. For example, according to the 'default' LCP scheme, no data is excluded from inclusion in the MAC TB for transmission using the allocated uplink communications resources, and data is selected from the plurality of logical channels in a highest-priority-first manner.

Figure 15:
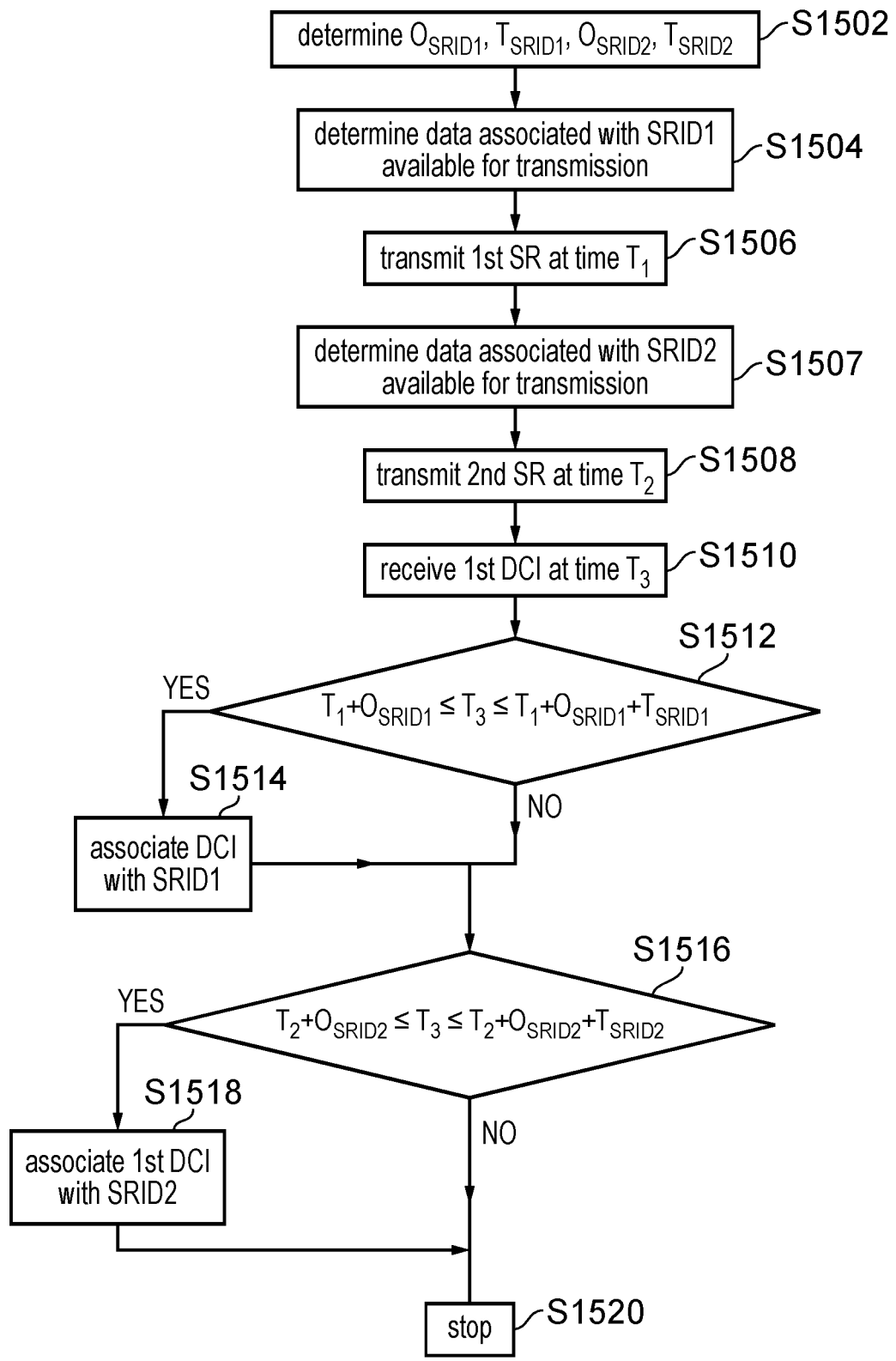
FIG. 15 is a flow chart for a process implemented by a communications device for associating one or more SR IDs with a DCI in accordance with embodiments of the present technique.

FIG. 15 is a flow chart for a process implemented by a communications device for associating one or more SR IDs with a DCI in accordance with embodiments of the present technique.

The process illustrated in FIG. 15 starts at step S1502, in which the communications device 104 determines time periods $O_{SRID1}$, $T_{SRID1}$, $O_{SRID2}$, and $T_{SRID2}$, defining start time offsets and durations of time windows associated with scheduling requests, when the scheduling requests are associated with first and second SR ID values SRID1 and SRID2.

In some embodiments, one or both of the start time offset and duration of a time window associated with an SR is determined based on the SR ID associated with the SR, for example in accordance with a predetermined mapping between SR ID and start time offset and/or time window duration.

At step S1504 the communications device determines that it is has data available for transmission which is associated with a first SR ID such as SRID1. At step S1506, the communications device transmits a first SR using the communications resources configured for the transmissions of SRs associated with SRID1 at a first time T1.

Subsequently at step S1507 the communications device determines that it has further data available for transmission, which is associated with a second SR ID, SRID2. At step S1508, the communications device 104 transmits a second SR using the corresponding communication resources configured for the transmission of SRs associated with the second SRID. The second SR is transmitted at time T2.

In step S1510, the communications device 104 receives a first DCI at time T3.

At step S1512, the communications device 104 determines whether the first DCI received at step S1510 is associated with the first SR transmitted at S1506. To do this, the communications device determines whether the time at which the first DCI was received, T3, falls within a time window bounded by $(T1+O_{SRID1})$ and $(T1+O_{SRID1}+T_{SRID1})$. If T3 falls within that window, then control passes to step S1514, in which the communications device 104 determines that the first DCI is associated with SRID1. Control then passes to step S1516.

If at step S1512 it is determined that T3 does not fall within the time window associated with the first SR then control passes directly to step S1516.

In step S1516, the communications device 104 determines whether the first DCI received at step S1510 is associated with the second SR transmitted in step S1508. This is done by determining whether T3 falls within a time window associated with the second SR bounded by $(T2+O_{SRID2})$ and $(T2+O_{SRID2}+T_{SRID2})$. If T3 falls within this time window then control passes to step S1518 in which the communications device 104 associates the DCI received at step S1510 with SRID2. Control then passes to step S1520 and the process ends. If at step S1516 it is determined that T3 does not fall within the window associated with the second SR, then control passes to step S1520 and the process ends.

If after the process ends and the DCI is not associated with any SR, the default LCP can be used.

Figure 16:
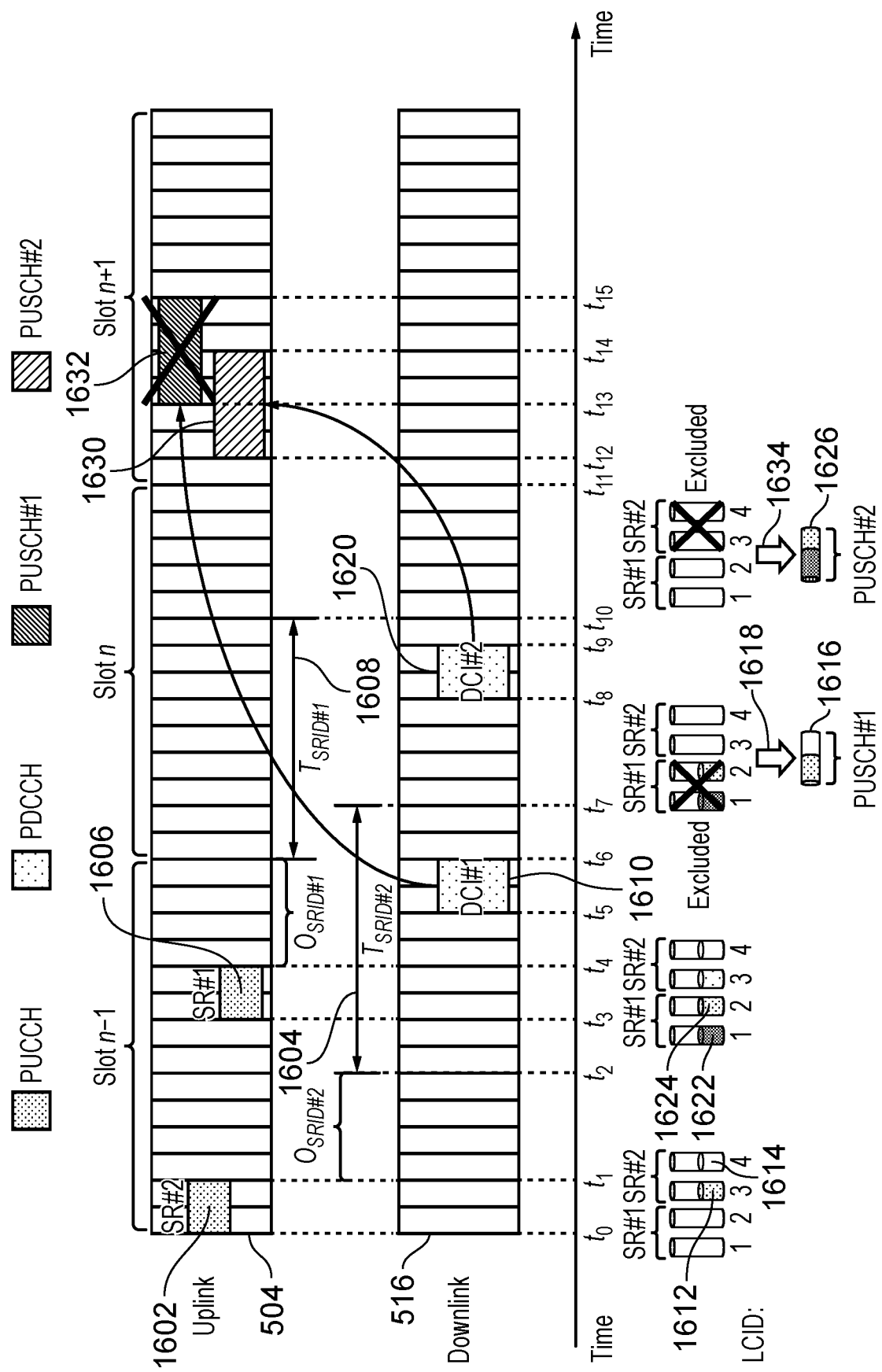
FIG. 16 illustrates an example time sequence of transmissions and a selection of data in accordance with determined LCP schemes in accordance with the process illustrated in FIG. 15.

FIG. 16 illustrates a time sequence of transmissions and the selection of data in accordance with determined LCP schemes in accordance with the process illustrated in FIG. 15 and described above. In the example scenario shown in FIG. 16, a first SR 1602 is transmitted in response to a determination that data associated with SRID 2 is available for transmission. The first SR 1602 accordingly has associated with it a time window of duration $T_{SRID2}$ 1604, which starts after a time $O_{SRID2}$ after the completion of the transmission of the first SR 1602.

A second SR 1606 is transmitted in response to a determination that data associated with SRID 1 is available for transmission and has associated with it a time window of duration $T_{SRID1}$ 1608 which starts after a time $O_{SRID2}$ after the completion of the transmission of the second SR 1606.

A first DCI 1610 is received starting at time t5 which falls within the time window 1604 associated with the first SR 1602. Accordingly the communications device 104 associates the first DCI 1610 with the SR ID associated with the data which triggered the transmission of the first SR 1602. This data corresponds to first data 1612 and second data 1614, both of which are associated with SR ID 2. Thus the communications device 104 associates the first DCI 1610 with the SR ID value 2 and selects the LCP scheme for selecting data for inclusion in the first MAC TB 1616 accordingly.

In the example shown in FIG. 16 an LCP scheme associated with an SRID is one in which data associated with that SRID is permitted to be included in the MAC TB, and other data is excluded from selection. As such the first LCP scheme 1618 selects data from the first and second data 1612, 1614 for inclusion in the first MAC TB 1616.

Similarly, the second DCI 1620 is received starting at time t8 and finishing at time t9 both of which are within the time window 1608 associated with the second SR 1606. The second SR 1606 was transmitted in response to determination by the communications device of third data 1622 and fourth data 1624 being available for transmission. Both the third data 1622 and the fourth data 1624 are associated with logical channels which are grouped and associated with the SRID value 1.

Based on the second DCI 1620 being received within the time window 1608 associated with the second SR 1606, the communications device 104 associates the second DCI with SRID value 2, and selects the LCP scheme 1626 accordingly. According to the LCP scheme 1634, which is associated with the SRID value 1, only data from logical channels associated with SR ID value 1 is permitted to be selected for inclusion in the second MAC TB 1626.

As shown in the example of FIG. 16, first communications resources 1632 and second communications resources 1630 overlap in time and thus in accordance with conventional techniques, the communications device refrains from transmitting using the first communications resources 1632 allocated by the first DCI 1610, because the first DCI 1610 was received prior to the reception of the second DCI 1620 allocating the second communications resource 1630.

Figure 17:
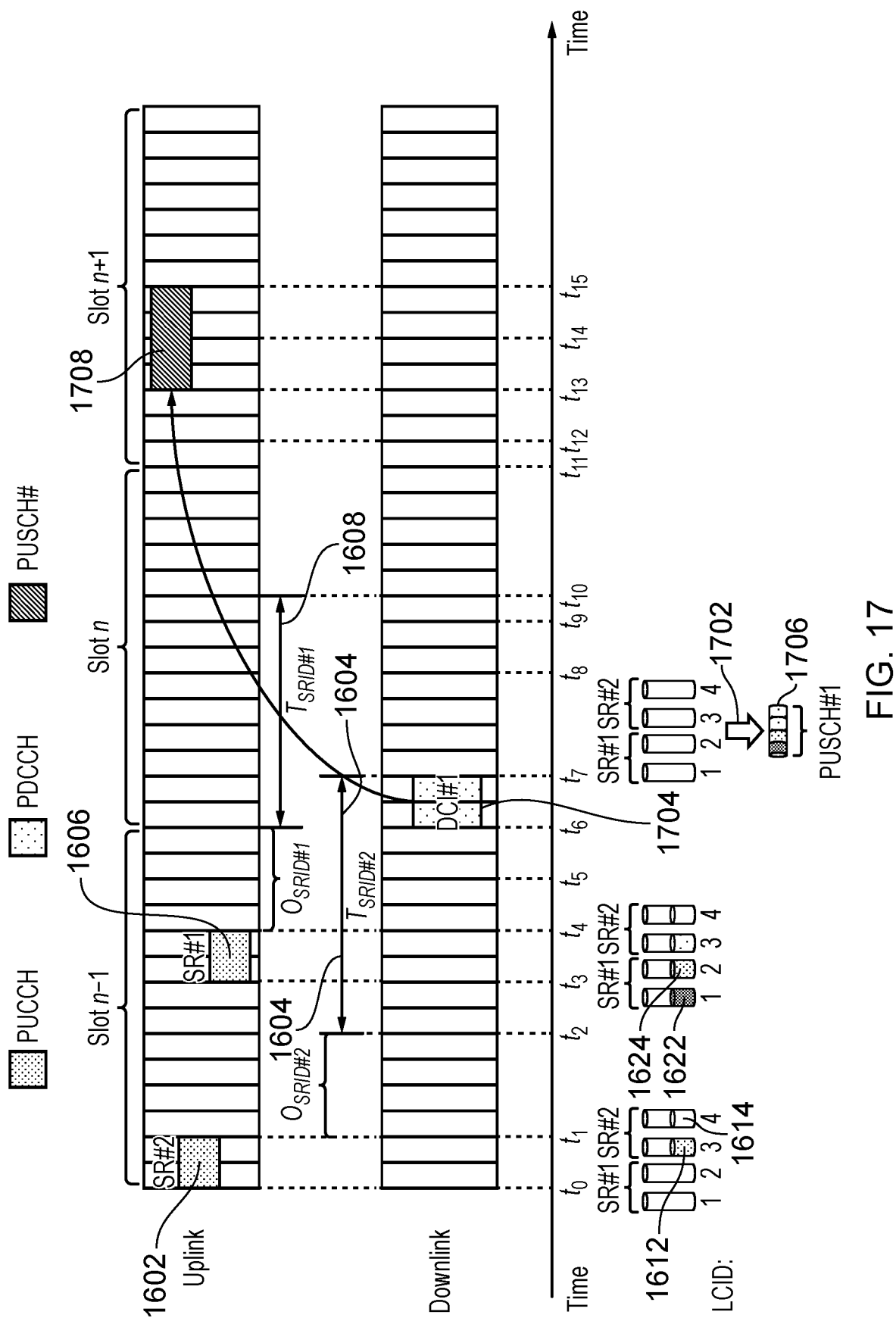
FIG. 17 illustrates a further example time sequence of transmissions in accordance with the process illustrated in FIG. 15.

FIG. 17 illustrates a time sequence of transmissions in accordance with the process illustrated in FIG. 15 and described above. Many of the elements shown in FIG. 17 are similar to like-numbered elements in FIG. 16 and for conciseness their description will be omitted.

As in the example of FIG. 16, first SR 1602 and second SR 1606 are each associated with respective time windows 1604, 1608. In the example of FIG. 17, the first DCI 1704 is received starting at time t6 and ending at time t7 which falls within both of the time windows 1604, 1608. The communications device 104 therefore determines that the first DCI 1704 is associated with both the first SR 1602 and the second SR 1606, and therefore with the respective SR IDs, SRID2, associated with the first SR 1602 and SRID1, associated with the second SR 1606.

The communications device 104 therefore determines as the selected LCP scheme 1702 an LCP scheme associated with both SRID 1 and with SRID 2. Accordingly, the communications device 104 selects for inclusion in a first MAC TB 1706 data from all LCIDs associated with SRID1 and SRID2. The first MAC TB 1706 is subsequently transmitted using uplink communication resources 1708 allocated by the first DCI 1704.

As illustrated in FIG. 17 a single DCI may be transmitted by the infrastructure equipment 101 in response to two or more scheduling requests and, in accordance with the process shown in FIG. 15, an appropriate LCP scheme can be determined based on the time at which the DCI is received relative to the times at which the respective scheduling request were transmitted. The selected LCP scheme may thus ensure that all of the data which is suitable for transmission in the allocated uplink communication resources 1708 is selected for inclusion in the corresponding MAC TB 1706.

Figure 18:
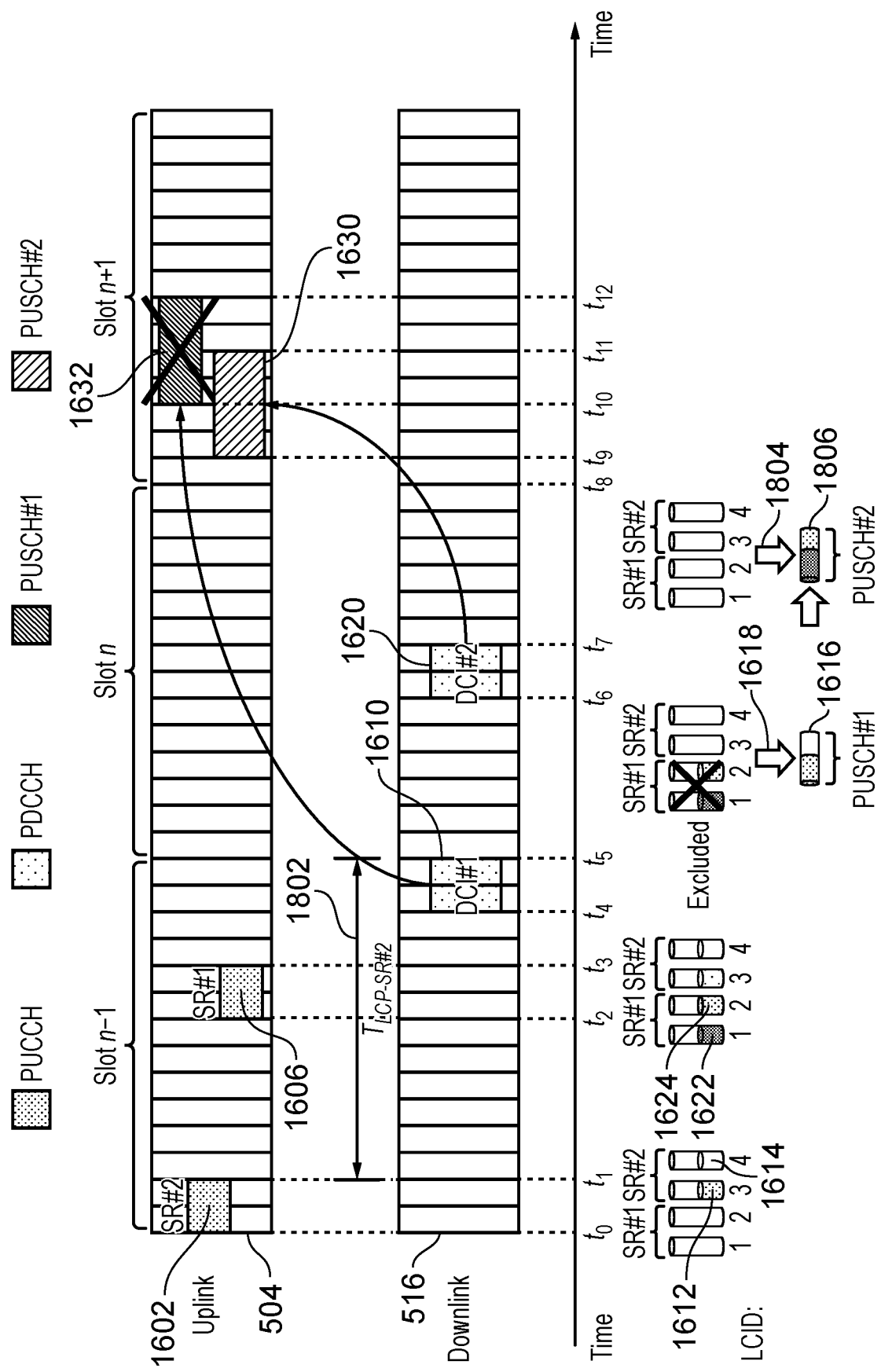
FIG. 18 illustrates a process for selecting an LCP scheme based on a time duration between consecutive transmissions of scheduling requests in accordance with embodiments of the present technique.

FIG. 18 illustrates a process for selecting an LCP scheme based on a time duration between consecutive transmissions of scheduling requests in accordance with embodiments of the present technique.

Many of the elements shown in FIG. 18 correspond to like-numbered elements in FIG. 16 and their description will be omitted for conciseness.

In accordance with the process illustrated in FIG. 18, the communications device 18 determines a time window 1802 (e.g. by starting a timer) starting at the end of the transmission of an SR. The time window has a predetermined duration $T_{LCP\text{-}SR}$, which may be dependent on the SR ID(s) associated with the data which triggered the transmission of the SR.

In the example of FIG. 18, the first SR 1602 is triggered in response to data associated with SR ID2, and thus the time window 1802 has a duration of $T_{LCP\text{-}SR2}$. Subsequently, the communications device 104 transmits the second SR 1606.

The communications device 104 determines whether or not the second SR 1606 is transmitted within the time window 1802 associated with the first SR 1602. If it is, then the communications device 104 determines that the second SR 1606 forms one of a sequence of SRs which starts with the first SR 1602.

Subsequently, the communications device 104 receives the first DCI 1610. The communications device 104 determines that the first DCI 1610 is a first DCI received after a sequence of SRs. Based on that determination, the communications device 104 associates the first DCI with only the SR ID value(s) associated with the first SR 1602 of the sequence. Accordingly, the communications device 104 selects as the LCP scheme 1618 a scheme whereby only data associated with the SR ID value(s) associated with the first SR 1602 of the sequence is eligible for selection for inclusion in the first MAC TB 1616.

The communications device 104 subsequently receives the second DCI 1620, and determines that it is a second, or later, DCI received in response to a sequence of SRs. In some embodiments, the communications device 104 selects as an LCP scheme 1804 for selecting data for a second MAC TB 1806 a 'default' LCP scheme, such as a conventional LCP scheme in which all available data is eligible for selection, in priority order, and in accordance with any Logical Channel parameters configured for the respective logical channels.

In some embodiments, the communications device 104 determines that, being the second DCI received in a sequence of DCIs which are received in response to a sequence of SRs, the second DCI 1620 is associated with the SR IDs of the data which triggered the second SR 1606. That is, in the example of FIG. 18, the second DCI 1620 is associated with SR ID 1, and determines that the LCP scheme 1804 comprises an LCP scheme in which only data associated with SR ID 1 is eligible for selection.

Although FIG. 18 shows an example of a sequence of two SRs and two DCIs, it will be appreciated that the process may be adapted in accordance with embodiments of the present technique to encompass any number (greater than one) of SRs and DCIs, and that in some embodiments, the number of DCIs need not correspond to the number of SRs.

In some embodiments, when a DCI is received, no further SRs transmitted after the reception of the DCI are considered part of the sequence of SRs which includes SRs transmitted prior to the reception of the DCI.

In some embodiments, there is no constraint on the time period between successive SRs for the SRs to be considered part of a sequence, provided that no DCI is received during that time period.

Figure 19:
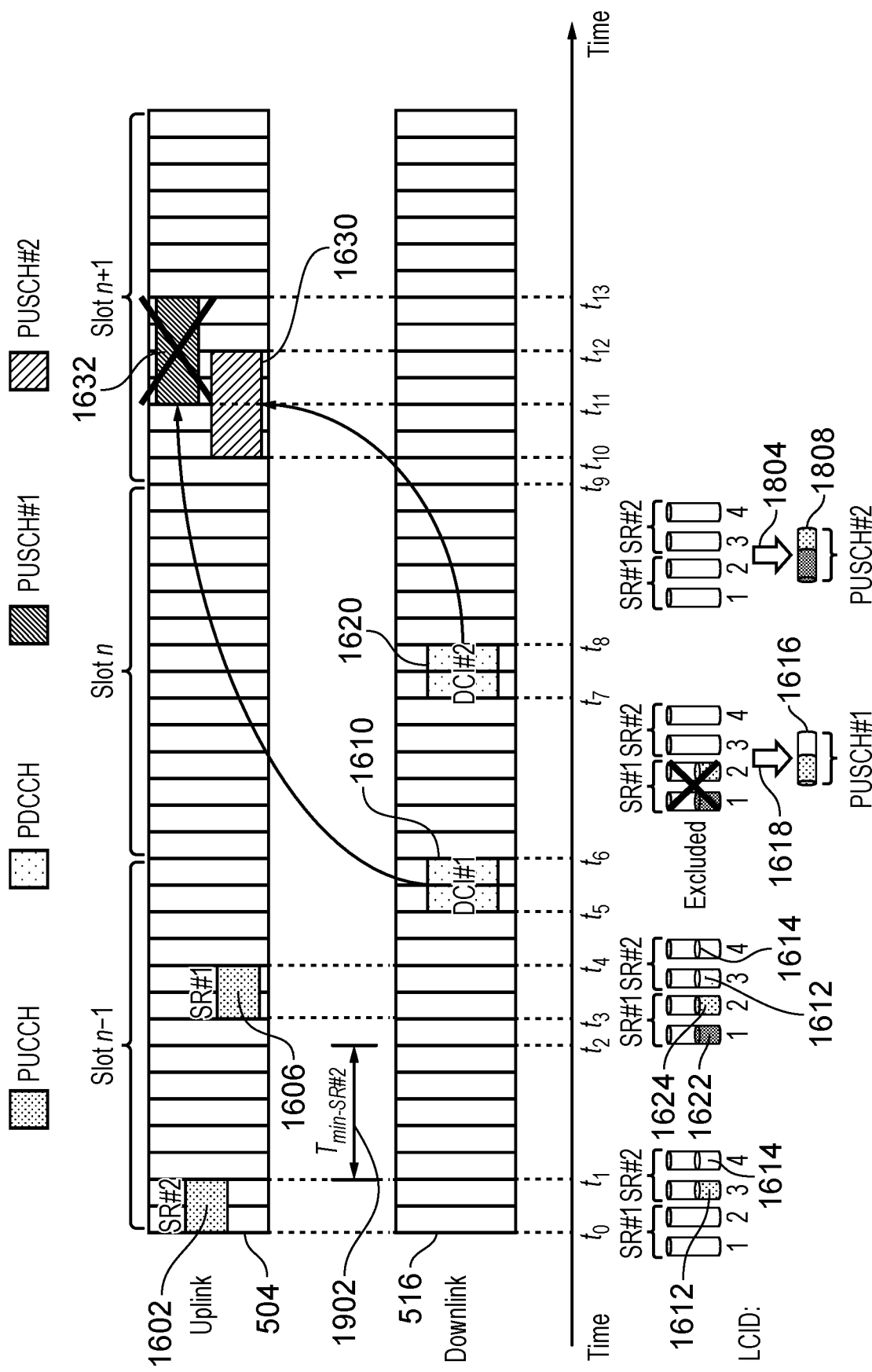
FIG. 19 illustrates a further process for selecting an LCP scheme based on a time duration between consecutive transmissions of scheduling requests in accordance with embodiments of the present technique.

FIG. 19 illustrates a process for selecting an LCP scheme based on a time duration between consecutive transmissions of scheduling requests in accordance with embodiments of the present technique.

Many of the elements shown in FIG. 19 correspond to like-numbered elements in FIG. 18 and their description will be omitted for conciseness.

In accordance with the process illustrated in FIG. 19, the communications device 104 transmits first and second SRs 1602, 1606 as described above. Subsequently, the communications device 104 receives first and second DCIs 1610, 1620.

The communications device 104 determines whether the first and second SRs 1602, 1606 form a sequence of SRs. The first and second SRs 1602, 1606 are considered to form a sequence if their transmission is separated by more than a predetermined time period. The predetermined time period may be determined based on the SR ID(s) associated with either the earlier or later of the two SRs 1602, 1606.

In the example of FIG. 19, the second SR 1606 is transmitted after the predetermined time period $T_{min\text{-}SR2}$ 1902 has elapsed following the transmission of the first SR 1602. Accordingly, the communications device 104 determines that the first and second SRs 1602, 1606 form all or part of a sequence of SRs.

In response to receiving the first DCI 1610, the communications device 104 selects the LCP scheme 1618 based on the determination that the first and second SRs 1602, 1606 form all or part of a sequence of SRs. The first DCI is accordingly associated with the first SR in the sequence, that is the first SR 1602, and the LCP scheme 1618 accordingly restricts selection of data for inclusion in the first MAC TB 1618 to data associated with logical channels (and hence SR IDs) corresponding to the first SR 1602.

If the communications device 104 determines that the transmissions of the first and second SRs 1602, 1606 were separated by less than the predetermined time period, then the communications device 104, in response to receiving the first DCI 1610, selects as the LCP scheme a default or conventional LCP scheme according to which all available data is eligible for selection for inclusion in the MAC TB 1618, subject to any Logical Channel parameters and relative priorities of associated logical channels.

According to the process illustrated in FIG. 19, if the infrastructure equipment receives the second SR 1606 sufficiently soon after receiving the first SR 1602, it may combine the processing of the SRs and allocate resources by means of at least the first DCI, taking into account both scheduling requests. Thus, the communications device 104 selects data for inclusion in a MAC TB formed in response to receiving the first DCI taking into account all data available for transmission.

On the other hand, if the infrastructure equipment has already processed the first SR 1602 when the second SR 1606 arrives, it may transmit (for example) the first DCI having regards only to the data corresponding to the first SR. Accordingly, in response to receiving the first DCI, the communications device 104 selects by means of the LCP scheme 1618 only data associated with logical channels (and/or otherwise with SR IDs) associated with the first SR 1602.

In response to receiving the second DCI 1620, then in some embodiments, the communications device 104 selects as the LCP scheme the 'default' scheme described above. In some other embodiments, the communications device 104 selects as the LCP scheme a scheme characterised by the SR ID(s) associated with the second SR 1606, on the basis that the second SR 1606 is the second in the sequence of SRs, and the second DCI 1620 is the second in a corresponding sequence of DCIs.

As described above, in some embodiments, the communications device 104 determines that a 'default' LCP scheme is to be used, in response to receiving a DCI allocating uplink resources.

In some embodiments of the present technique, an LCP scheme may be determined based on a determination that two or more DCIs have been received within a same timeslot. In some such embodiments, an LCP scheme may be selected based on a determination that the communications resources allocated by two or more DCIs received within the same timeslot conflict such that the communications device 104 is not capable of transmitting two MAC TBs using the allocated communications resources. As described above, the conflict may arise because the communications resources overlap in time, and/or because processing capabilities of the communications device 104 are insufficient for the formation and transmission of both MAC TBs using the communications resources.

In some embodiments of the present technique, according to an LCP scheme for selecting data in response to receiving a DCI, data may be selected from all data available for transmission at the beginning of a slot in which the DCI is received, irrespective of whether that data would have been selected in response to receiving a different DCI which is received within the same timeslot. Preferably, according to such an LCP scheme, data is selected in accordance with the default scheme as described above based on a highest priority first selection.

Accordingly, when two DCIs are received within a same timeslot, allocating conflicting communications resources, it can be ensured that high priority data will be successfully transmitted, where that data is selected from all data available for transmission at the beginning of the slot.

In some embodiments, if, a second DCI has been received before the selection, in accordance with an LCP scheme, of data in response to receiving a first DCI within the same timeslot, then in accordance with the LCP scheme, the MAC may not update counter parameters (such as decrementing the bucket size) in respect of any logical channel whose data is selected. Accordingly, all data that was available at the start of the timeslot would still be a candidate for selection in accordance with a second LCP scheme performed in response to receiving the second DCI. Such embodiments ensure that high priority data may be successfully transmitted, irrespective of whether only communications resources allocated by the first DCI, or only communications resources allocated by the second DCI, are used for the transmission of a MAC TB.

In the examples illustrated above, each LCP scheme is selected and implemented in response to the reception of a DCI. Accordingly, in some embodiments, an LCP scheme may be carried out without regards to the possibility of a subsequent DCI being received.

In some embodiments, the selection of an LCP scheme and the selection of data in accordance with the selected LCP scheme, for transmission using allocated uplink communications resources, may be scheduled based on a start time of the allocated uplink communications resources. For example, in some embodiments, the selection and implementation of an LCP scheme may be scheduled to occur a minimum time period before the start time of the allocated uplink communications resources, the minimum time period corresponding to the maximum duration required by the communications device 104 to select the LCP scheme, select the data in accordance with the LCP scheme, and form and process (encode, etc.) the MAC TB to be ready for transmission.

Preferably, the minimum time period is a predetermined time period which is known to the infrastructure equipment 101.

For example, in the example shown in FIG. 6, the predetermined time period may be two OFDM symbol periods (where each slot is divided into fourteen equal symbol periods). In response to receiving the first DCI 602 allocating communications resources starting at time t11, the communications device schedules for time t10, being two OFDM symbol periods before time t11, the selection of a first LCP scheme.

Similarly, in response to receiving the second DCI 604 allocating second communications resources 608 starting at time t9, the communications device schedules for time t8, being two OFDM symbol periods before time t9, the selection of a second LCP scheme.

At time t8, the communications device 104 accordingly selects an LCP scheme and selects data for transmission using the second uplink communications resources 608. In some embodiments, the selected LCP scheme is the default scheme. In some embodiments, the selected LCP scheme is selected in accordance with one of the techniques disclosed herein. Similarly, at time t10, the communications device 104 accordingly selects a second LCP scheme and selects data for transmission using the first uplink communications resources 606.

It will be appreciated that in such embodiments, an LCP scheme which selects highest priority data first will ensure that the transmission of high priority data may be ensured to begin prior to the transmission of lower priority data.

According to some embodiments of the present technique, one or more of the processes described above may be modified, adapted or combined. In particular, one or more steps of the above processes may be omitted or performed in a different sequence.

For example any of the processes illustrated in FIG. 14, FIG. 15, FIG. 16, FIG. 17, FIG. 18 or FIG. 19 may be adapted to perform the functionality of step S912 of the process illustrated in FIG. 12 and described above.

As described above, in some embodiments, the communications device 104 selects an LCP scheme, from a plurality of LCP schemes, for the selection of data for transmission using uplink communications resources, in response to receiving an allocation message comprising an indication of the allocated uplink communications resources. In some embodiments, the selection of the LCP scheme based on one or more aspects of the allocation message.

In some embodiments, the infrastructure equipment 101 determines an LCP scheme to be selected by the communications device 101 and sets the aspect(s) of the allocation message accordingly (for example, in accordance with one or more of the examples described herein) when or before transmitting the allocation message.

In some embodiments, the infrastructure equipment 101 may perform one or more determinations which may substantially correspond to those performed by the communications device 104 as described in example embodiments herein, and in response to transmitting an allocation message, accordingly determines an LCP scheme which corresponds to the LCP scheme selected by the communications device 104. For example, the infrastructure equipment 101 may determine that a particular LCP scheme will be selected by the communications device 104 based on a relative sequencing and/or timing of received scheduling request messages and corresponding transmitted allocation messages.

Thus there has been described a method of selecting data for transmission in a wireless communications network by a communications device, the method comprising: receiving by the communications device an allocation message, the allocation message comprising an indication of first communications resources for transmitting of data from a first group of one or more of a plurality of logical channels and the allocation message is received in response to a second scheduling request message requesting the first communications resources for transmitting the data from the first group of the one or more logical channels which was transmitted after a first scheduling request message requesting second communications resources for transmitting data from a second group of the one or more of the plurality of logical channels, in response to receiving the allocation message, selecting a logical channel prioritisation (LCP) scheme for allocating a capacity provided by the first communications resources for transmitting the data from the first group of one or more of the logical channels or from the second group of the one or more of the logical channels using the first communications resources, the LCP scheme being selected from a plurality of LCP schemes, each of the plurality of LCP schemes determining a different allocation of an available capacity provided by the first communications resources for transmitting data from the plurality of logical channels, and selecting data from the plurality of logical channels to be transmitted using the first communications resources in accordance with the selected LCP scheme.

There has also been disclosed a method of allocating by an infrastructure equipment communications resources for transmission of data in a wireless communications network, the method comprising: receiving a first scheduling request message (SR #2) requesting second communications resources (PUSCH #1) for transmitting data from a second group of one or more of a plurality of logical channels, after receiving the first scheduling request message, receiving a second scheduling request message (SR #1) requesting first communications resources (PUSCH #2) for transmitting data from a first group of the one or more logical channels, transmitting an allocation message (DCI #2), the allocation message comprising an indication of the first communications resources (PUSCH #2) for transmitting of data from the first group of one or more of a plurality of logical channels, determining a logical channel prioritisation (LCP) scheme, the determined LCP scheme being one of a plurality of LCP schemes, each of the plurality of LCP schemes determining a different allocation of an available capacity provided by the first communications resources (PUSCH #2) for transmitting data from the plurality of logical channels, and receiving data transmitted using the first communications resources, wherein the data transmitted using the first communications resources is selected from the plurality of logical channels in accordance with the determined LCP scheme.

It may be noted various example approaches discussed herein may rely on information which is predetermined/ predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to machine type communication devices/IoT devices or other narrowband communications devices, but can be applied more generally, for example in respect of any type communications device operating with a wireless link to the communication network.

It will further be appreciated that the principles described herein are not applicable only to LTE-based wireless telecommunications systems, but are applicable for any type of wireless telecommunications system that supports a random access procedure comprising an exchange of random access procedure messages between a communications device and a base station.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of selecting data for transmission in a wireless communications network by a communications device, the method comprising: receiving by the communications device an allocation message (DCI #2), the allocation message comprising an indication of first communications resources (PUSCH #2) for transmitting of data from a first group of one or more of a plurality of logical channels and the allocation message is received in response to a second scheduling request message (SR #1) requesting the first communications resources (PUSCH #2) for transmitting the data from the first group of the one or more logical channels which was transmitted after a first scheduling request message (SR #2) requesting second communications resources (PUSCH #1) for transmitting data from a second group of the one or more of the plurality of logical channels, in response to receiving the allocation message, selecting a logical channel prioritisation (LCP) scheme for allocating a capacity provided by the first communications resources for transmitting the data from the first group of one or more of the logical channels or from the second group of the one or more of the logical channels using the first communications resources, the LCP scheme being selected from a plurality of LCP schemes, each of the plurality of LCP schemes determining a different allocation of an available capacity provided by the first communications resources (PUSCH #2) for transmitting data from the plurality of logical channels, and selecting data from the plurality of logical channels to be transmitted using the first communications resources in accordance with the selected LCP scheme.

Paragraph 2. A method according to paragraph 1, the method comprising: detecting that data associated with the second group of logical channels is to be transmitted on an uplink of the wireless communications network, transmitting the first request for communications resources to be scheduled for transmitting the data from the second group of logical channels, and after transmitting the first request, detecting that data associated with the first group of logical channels is to be transmitted on an uplink of the wireless communications network, wherein the data selected according to the selected LCP scheme includes data from the first group of logical channels.

Paragraph 3. A method according to paragraph 1 or paragraph 2, wherein according to the selected LCP, each of two or more of the plurality of logical channels is associated with a priority level, and data associated with a logical channel having a first priority level is selected for transmission in preference to data associated with a logical channel having a second priority level lower than the first priority level, and the selected LCP scheme is selected from the plurality of LCP schemes based on the allocation message.

Paragraph 4. A method according to any of paragraphs 1 to 3, wherein according to the selected LCP scheme, data associated with one or more logical channels is excluded from selection and selecting the LCP scheme for selecting the data for transmission using the first communications resources comprises determining the one or more logical channels excluded from selection.

Paragraph 5. A method according to any of paragraphs 1 to 4, the method comprising before receiving the allocation message, receiving a second allocation message comprising an indication of second communications resources received in response to the first scheduling request message (SR #1) requesting the second communications resources (PUSCH #1) for transmitting the data from the second group of the one or more logical channels, in response to receiving the second allocation message, selecting a second LCP scheme, wherein according to the second selected LCP scheme, data selected for transmission using the second communications resources may be selected for transmission using the first communications resources, and selecting data from the plurality of logical channels to be transmitted using the first communications resources comprises selecting a portion of the data selected for transmission using the second communications resources.

Paragraph 6. A method according to paragraph 5, the method comprising determining that the allocation message and the second allocation message were received during a same timeslot, wherein selecting the logical channel prioritisation (LCP) scheme is based on the determining that the allocation message and the second allocation message were received during the same timeslot.

Paragraph 7. A method according to paragraph 6, wherein in accordance with the selected LCP scheme, selecting the data to be transmitted using the first communications resources comprises selecting from all data which was available for transmission at the start of the same timeslot, irrespective of the data selected to be transmitted using the second communications resources in accordance with the second selected LCP scheme.

Paragraph 8. A method according to paragraph 5, the method comprising determining that the allocation message was received prior to an end time of the second communications resources, wherein selecting the data from the plurality of logical channels to be transmitted using the first communications resources by selecting a portion of the data selected for transmission using the second communications resources is in response to determining that the allocation message was received prior to an end time of the second communications resources.

Paragraph 9. A method according to paragraph 8, the method comprising determining that the first communications resources overlap in time with the second communications resources, and in response to determining that the first communications resources overlap in time with the second communications resources, refraining from transmitting using the second communications resources.

Paragraph 10. A method according to paragraph 9, wherein selecting the data from the plurality of logical channels to be transmitted using the first communications resources by selecting a portion of the data selected for transmission using the second communications resources is in response to determining that the first communications resources overlap in time with the second communications resources.

Paragraph 11. A method according to paragraph 5, the method comprising determining that the first communications resources start before an end time of the second communications resources, wherein selecting the data from the plurality of logical channels to be transmitted using the first communications resources by selecting a portion of the data selected for transmission using the second communications resources is in response to determining that the second communications resources start before the first end time.

Paragraph 12. A method according to any of paragraphs 1 to 11, wherein selecting the LCP scheme for selecting the data for transmission using the first communications resources comprises determining that an error detection portion of the allocation message was generated based on a predetermined temporary identifier.

Paragraph 13. A method according to any of paragraphs 1 to 12, wherein selecting the LCP scheme for selecting the data for transmission using the first communications resources comprises determining that the allocation message conforms to a predetermined format.

Paragraph 14. A method according to paragraph 13, wherein the wireless communications network provides a wireless access interface comprising communications resources divided in time into timeslots and further divided into orthogonal frequency division multiplexing (OFDM) symbol periods, and in accordance with the predetermined format, the first communications resources begin on a first OFDM symbol period of a timeslot.

Paragraph 15. A method according to any of paragraphs 1 to 14, wherein selecting the LCP scheme for selecting the data for transmission using the first communications resources comprises determining that the allocation message was transmitted using predetermined communications resources associated with the determined LCP scheme.

Paragraph 16. A method according to paragraph 15, wherein the predetermined communications resources comprise communications resources of a physical downlink control channel Paragraph 17. A method according to paragraph 16, wherein selecting the LCP scheme for selecting the data for transmission using the first communications resources comprises determining that the allocation message was transmitted using a predetermined number and location of frequency resources.

Paragraph 18. A method according to any of paragraphs 1 to 17, wherein the allocation message comprises an indication of modulation and coding scheme parameters for the transmission of the data using the first communications resources, and selecting the LCP scheme for selecting the data for transmission using the first communications resources comprises determining that the modulation and coding scheme parameters indicated by the allocation message satisfy predetermined conditions associated with the selected LCP scheme.

Paragraph 19. A method according to paragraph 18, the method comprising determining an average modulation and coding scheme, the average modulation and coding scheme being determined based on modulation and coding scheme parameters used for a plurality of previous transmissions of data by the communications device, wherein the modulation and coding scheme parameters indicated by the allocation message satisfy predetermined conditions associated with the selected LCP scheme if they provide a reliability which is greater than a reliability provided by the determined average modulation and coding scheme.

Paragraph 20. A method according to any of paragraphs 1 to 19, wherein the allocation message comprises an indication of power control parameters for the transmission of the data using the first communications resources, and selecting the LCP scheme for selecting the data for transmission using the first communications resources comprises determining that the power control parameters for the transmission of the data using the first communications resources are associated with one or more logical channels of the plurality of logical channels.

Paragraph 21. A method according to any of paragraphs 1 to 20, wherein the allocation message comprises an indication of a number of repetitions to be used for the transmission of the data using the first communications resources, and selecting the logical channel prioritisation (LCP) scheme for selecting the data for transmission using the first communications resources comprises determining that the number of repetitions to be used for the transmission of the data using the first communications resources is associated with one or more logical channels of the plurality of logical channels.

Paragraph 22. A method according to any of paragraphs 1 to 21, wherein each of one or more of the plurality of logical channels is associated with one of one or more scheduling request groups, and each scheduling request group of the one or more scheduling request groups is associated with predetermined communications resources for transmitting by the communications device a scheduling request indicating that the communications device has available data associated with one or more of the logical channels associated with the scheduling request group.

Paragraph 23. A method according to paragraph 22 wherein selecting the logical channel prioritisation (LCP) scheme for selecting the data for transmission using the first communications resources comprises determining that the allocation message is associated with a first scheduling request group.

Paragraph 24. A method according to paragraph 23, wherein the first group of the one or more logical channels are associated with the first scheduling request group, the method comprising transmitting the second scheduling request message using the predetermined communications resources for transmitting a scheduling request message associated with the first scheduling request group.

Paragraph 25. A method according to paragraph 24, wherein determining that the allocation message is associated with a first scheduling request group comprises determining that the allocation message is associated with the second scheduling request message.

Paragraph 26. A method according to paragraph 25, the method comprising before transmitting the second scheduling request, transmitting the first scheduling request using the predetermined communications resources for transmitting a scheduling request associated with a second scheduling request group, the second group of the one or more logical channels being associated with the second scheduling request group, after transmitting the second scheduling request and before receiving the allocation message, receiving a second allocation message, wherein determining that the allocation message is associated with the first scheduling request comprises determining that the second allocation message was received after the transmission of the second scheduling request and before the allocation message was received.

Paragraph 27. A method according to paragraph 25, wherein determining that the allocation message is associated with the second scheduling request comprises determining that the allocation message was received within a first time window starting a first predetermined time after the second scheduling request is transmitted and having a duration of a second predetermined time.

Paragraph 28. A method according to paragraph 27 wherein at least one of the first predetermined time and the second predetermined time are determined based on the first scheduling request group.

Paragraph 29. A method according to paragraph 27 or paragraph 28, the method comprising before transmitting the second scheduling request, transmitting the first scheduling request using the predetermined communications resources for transmitting a scheduling request associated with a second scheduling request group, the second group of the one or more logical channels being associated with the second scheduling request group, determining a second time window starting after the second scheduling request is transmitted, determining that the allocation message is received within the second time window, in response to determining that the allocation message is received within the second time window, determining that the allocation message is associated with the second scheduling request group.

Paragraph 30. A method according to paragraph 24, the method comprising before transmitting the second scheduling request, transmitting the first scheduling request, wherein determining that the allocation message is associated with a first scheduling request group comprises determining that the second scheduling request was transmitted within a predetermined time after the transmission of the first scheduling request.

Paragraph 31. A method according to paragraph 24, the method comprising before transmitting the second scheduling request, transmitting the first scheduling request, wherein determining that the allocation message is associated with a first scheduling request group comprises determining that the second scheduling request was transmitted after a predetermined time after the transmission of the first scheduling request.

Paragraph 32. A method according to any of paragraphs 23 to 31, wherein according to the selected LCP scheme, data not associated with the first scheduling request group is not to be selected for transmission.

Paragraph 33. A method according to any of paragraphs 23 to 31, wherein according to the determined logical channel prioritisation scheme, data associated with the first scheduling request group is to be selected for transmission with highest priority.

Paragraph 34. A method according to any of paragraphs 1 to 33, the method comprising in response to receiving the allocation message, scheduling the selection of the LCP scheme to occur no sooner than a predetermined time period before the start of the first communications resources.

Paragraph 35. A method according to any of paragraphs 1 to 34, wherein the first allocation message comprises downlink control information transmitted on a physical downlink control channel.

Paragraph 36. A method of allocating by an infrastructure equipment communications resources for transmission of data in a wireless communications network, the method comprising: receiving a first scheduling request message (SR #2) requesting second communications resources (PUSCH #1) for transmitting data from a second group of one or more of a plurality of logical channels, after receiving the first scheduling request message, receiving a second scheduling request message (SR #1) requesting first communications resources (PUSCH #2) for transmitting data from a first group of the one or more logical channels, transmitting an allocation message (DCI #2), the allocation message comprising an indication of the first communications resources (PUSCH #2) for transmitting of data from the first group of one or more of a plurality of logical channels, determining a logical channel prioritisation (LCP) scheme, the determined LCP scheme being one of a plurality of LCP schemes, each of the plurality of LCP schemes determining a different allocation of an available capacity provided by the first communications resources (PUSCH #2) for transmitting data from the plurality of logical channels, and receiving data transmitted using the first communications resources, wherein the data transmitted using the first communications resources is selected from the plurality of logical channels in accordance with the determined LCP scheme.

Paragraph 37. A communications device for use in a wireless communications network, the wireless communications network comprising an infrastructure equipment providing a wireless access interface, the communications device comprising a transmitter configured to transmit uplink data via the wireless access interface, a receiver configured to receive signals, and a controller configured to control the transmitter and the receiver so that the communications device is operable: to receive an allocation message (DCI #2), the allocation message comprising an indication of first communications resources (PUSCH #2) for transmitting of data from a first group of one or more of a plurality of logical channels and the allocation message is received in response to a second scheduling request message (SR #1) requesting the first communications resources (PUSCH #2) for transmitting the data from the first group of the one or more logical channels which was transmitted after a first scheduling request message (SR #2) requesting second communications resources (PUSCH #1) for transmitting data from a second group of the one or more of the plurality of logical channels, in response to receiving the allocation message, to select a logical channel prioritisation (LCP) scheme for allocating a capacity provided by the first communications resources for transmitting the data from the first group of one or more of the logical channels or from the second group of the one or more of the logical channels using the first communications resources, the LCP scheme being selected from a plurality of LCP schemes, each of the plurality of LCP schemes determining a different allocation of an available capacity provided by the first communications resources (PUSCH #2) for transmitting data from the plurality of logical channels, and to select data from the plurality of logical channels to be transmitted using the first communications resources in accordance with the selected LCP scheme.

Paragraph 38. Circuitry for a communications device for use in a wireless communications network, the wireless communications network comprising an infrastructure equipment providing a wireless access interface, the circuitry comprising transmitter circuitry configured to transmit data via the wireless access interface, receiver circuitry configured to receive signals, and controller circuitry configured to control the transmitter circuitry and the receiver circuitry so that the communications device is operable: to receive an allocation message (DCI #2), the allocation message comprising an indication of first communications resources (PUSCH #2) for transmitting of data from a first group of one or more of a plurality of logical channels and the allocation message is received in response to a second scheduling request message (SR #1) requesting the first communications resources (PUSCH #2) for transmitting the data from the first group of the one or more logical channels which was transmitted after a first scheduling request message (SR #2) requesting second communications resources (PUSCH #1) for transmitting data from a second group of the one or more of the plurality of logical channels, in response to receiving the allocation message, to select a logical channel prioritisation (LCP) scheme for allocating a capacity provided by the first communications resources for transmitting the data from the first group of one or more of the logical channels or from the second group of the one or more of the logical channels using the first communications resources, the LCP scheme being selected from a plurality of LCP schemes, each of the plurality of LCP schemes determining a different allocation of an available capacity provided by the first communications resources (PUSCH #2) for transmitting data from the plurality of logical channels, and to select data from the plurality of logical channels to be transmitted using the first communications resources in accordance with the selected LCP scheme.

Paragraph 39. Infrastructure equipment for use in a wireless communications network, the infrastructure equipment providing a wireless access interface, the infrastructure equipment comprising a transmitter configured to transmit signals to a communications device via the wireless access interface in a cell, a receiver configured to receive data from the communications device, and a controller, configured to control the transmitter and the receiver so that the infrastructure equipment is operable: to receive a first scheduling request message (SR #2) requesting second communications resources (PUSCH #1) for transmitting data from a second group of one or more of a plurality of logical channels, after receiving the first scheduling request message, to receive a second scheduling request message (SR #1) requesting first communications resources (PUSCH #2) for transmitting data from a first group of the one or more logical channels, to transmit an allocation message (DCI #2), the allocation message comprising an indication of the first communications resources (PUSCH #2) for transmitting of data from the first group of one or more of a plurality of logical channels, to determine a logical channel prioritisation (LCP) scheme, the determined LCP scheme being one of a plurality of LCP schemes, each of the plurality of LCP schemes determining a different allocation of an available capacity provided by the first communications resources (PUSCH #2) for transmitting data from the plurality of logical channels, and to receive data transmitted using the first communications resources, wherein the data transmitted using the first communications resources is selected from the plurality of logical channels in accordance with the determined LCP scheme.

Paragraph 40. Circuitry for an infrastructure equipment for use in a wireless communications network, the infrastructure equipment providing a wireless access interface, the circuitry comprising transmitter circuitry configured to transmit signals to a communications device via the wireless access interface in a cell, receiver circuitry configured to receive data from the communications device, and controller circuitry, configured to control the transmitter circuitry and the receiver circuitry so that the infrastructure equipment is operable: to receive a first scheduling request message (SR #2) requesting second communications resources (PUSCH #1) for transmitting data from a second group of one or more of a plurality of logical channels, after receiving the first scheduling request message, to receive a second scheduling request message (SR #1) requesting first communications resources (PUSCH #2) for transmitting data from a first group of the one or more logical channels, to transmit an allocation message (DCI #2), the allocation message comprising an indication of the first communications resources (PUSCH #2) for transmitting of data from the first group of one or more of a plurality of logical channels, to determine a logical channel prioritisation (LCP) scheme, the determined LCP scheme being one of a plurality of LCP schemes, each of the plurality of LCP schemes determining a different allocation of an available capacity provided by the first communications resources (PUSCH #2) for transmitting data from the plurality of logical channels, and to receive data transmitted using the first communications resources, wherein the data transmitted using the first communications resources is selected from the plurality of logical channels in accordance with the determined LCP scheme.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] RP-182090, "Revised SID: Study on NR Industrial Internet of Things (IoT)," RAN #81.
[2] Holma H. and Toskala A, "LTE for UMTS OFDMA and SC-FDMA based radio access", John Wiley and Sons, 2009
[3] 3GPP TS 38.321, "Medium Access Control (MAC) protocol specification (Rel-15)", v15.3.0
[4] R2-1818795, "LS on Intra-UE Prioritization/Multiplexing," RAN2, RAN2 #104
[5] 3GPP TS 38.825

What is claimed is:

1. A method of selecting data for transmission in a wireless communications network by a communications device, the method comprising:
receiving by the communications device an allocation message, the allocation message comprising an indication of first communications resources for transmitting of data from a first group of one or more of a plurality of logical channels and the allocation message is received in response to a second scheduling request message requesting the first communications resources for transmitting the data from the first group of the one or more logical channels which was transmitted after a first scheduling request message requesting second communications resources for transmitting data from a second group of the one or more of the plurality of logical channels, in response to receiving the allocation message, selecting a logical channel prioritisation (LCP) scheme for allocating a capacity provided by the first communications resources for transmitting the data from the first group of one or more of the logical channels or from the second group of the one or more of the logical channels using the first communications resources, the LCP scheme being selected from a plurality of LCP schemes, each of the plurality of LCP schemes determining a different allocation of an available capacity provided by the first communications resources for transmitting data from the plurality of logical channels, and selecting data from the plurality of logical channels to be transmitted using the first communications resources in accordance with the selected LCP scheme.

2. A method according to claim 1, the method comprising:

detecting that data associated with the second group of logical channels is to be transmitted on an uplink of the wireless communications network, transmitting the first request for communications resources to be scheduled for transmitting the data from the second group of logical channels, and after transmitting the first request, detecting that data associated with the first group of logical channels is to be transmitted on an uplink of the wireless communications network, wherein the data selected according to the selected LCP scheme includes data from the first group of logical channels.

3. A method according to claim 1, wherein according to the selected LCP, each of two or more of the plurality of logical channels is associated with a priority level, and data associated with a logical channel having a first priority level is selected for transmission in preference to data associated with a logical channel having a second priority level lower than the first priority level, and the selected LCP scheme is selected from the plurality of LCP schemes based on the allocation message.

4. A method according to claim 1, wherein according to the selected LCP scheme, data associated with one or more logical channels is excluded from selection and selecting the LCP scheme for selecting the data for transmission using the first communications resources comprises determining the one or more logical channels excluded from selection.

5. A method according to claim 1, the method comprising before receiving the allocation message, receiving a second allocation message comprising an indication of second communications resources received in response to the first scheduling request message (SR #1) requesting the second communications resources (PUSCH #1) for transmitting the data from the second group of the one or more logical channels, in response to receiving the second allocation message, selecting a second LCP scheme, wherein according to the second selected LCP scheme, data selected for transmission using the second communications resources may be selected for transmission using the first communications resources, and selecting data from the plurality of logical channels to be transmitted using the first communications resources comprises selecting a portion of the data selected for transmission using the second communications resources.

6. A method according to claim 5, the method comprising determining that the allocation message and the second allocation message were received during a same timeslot, wherein selecting the logical channel prioritisation (LCP) scheme is based on the determining that the allocation message and the second allocation message were received during the same timeslot.

7. A method according to claim 1, wherein selecting the LCP scheme for selecting the data for transmission using the first communications resources comprises determining that an error detection portion of the allocation message was generated based on a predetermined temporary identifier.

8. A method according to claim 1, wherein selecting the LCP scheme for selecting the data for transmission using the first communications resources comprises determining that the allocation message conforms to a predetermined format.

9. A method according to claim 8, wherein the wireless communications network provides a wireless access interface comprising communications resources divided in time into timeslots and further divided into orthogonal frequency division multiplexing (OFDM) symbol periods, and in accordance with the predetermined format, the first communications resources begin on a first OFDM symbol period of a timeslot.

10. A method according to claim 1, wherein selecting the LCP scheme for selecting the data for transmission using the first communications resources comprises determining that the allocation message was transmitted using predetermined communications resources associated with the determined LCP scheme.

11. A method according to claim 10, wherein the predetermined communications resources comprise communications resources of a physical downlink control channel.

12. A method according to claim 11, wherein selecting the LCP scheme for selecting the data for transmission using the first communications resources comprises determining that the allocation message was transmitted using a predetermined number and location of frequency resources.

13. A method according to claim 1, wherein the allocation message comprises an indication of modulation and coding scheme parameters for the transmission of the data using the first communications resources, and selecting the LCP scheme for selecting the data for transmission using the first communications resources comprises determining that the modulation and coding scheme parameters indicated by the allocation message satisfy predetermined conditions associated with the selected LCP scheme.

14. A method according to claim 13, the method comprising determining an average modulation and coding scheme, the average modulation and coding scheme being determined based on modulation and coding scheme parameters used for a plurality of previous transmissions of data by the communications device, wherein the modulation and coding scheme parameters indicated by the allocation message satisfy predetermined conditions associated with the selected LCP scheme if they provide a reliability which is greater than a reliability provided by the determined average modulation and coding scheme.

15. A method according to claim 1, wherein the allocation message comprises an indication of power control parameters for the transmission of the data using the first communications resources, and selecting the LCP scheme for selecting the data for transmission using the first communications resources comprises determining that the power control parameters for the transmission of the data using the first communications resources are associated with one or more logical channels of the plurality of logical channels.

16. A method according to claim 1, wherein the allocation message comprises an indication of a number of repetitions to be used for the transmission of the data using the first communications resources, and selecting the logical channel prioritisation (LCP) scheme for selecting the data for transmission using the first communications resources comprises determining that the number of repetitions to be used for the transmission of the data using the first communications resources is associated with one or more logical channels of the plurality of logical channels.

17. A method according to claim 1, wherein each of one or more of the plurality of logical channels is associated with one of one or more scheduling request groups, and each scheduling request group of the one or more scheduling request groups is associated with predetermined communications resources for transmitting by the communications device a scheduling request indicating that the communications device has available data associated with one or more of the logical channels associated with the scheduling request group.

18. A method according to claim 17, wherein selecting the logical channel prioritisation (LCP) scheme for selecting the data for transmission using the first communications resources comprises determining that the allocation message is associated with a first scheduling request group.

19. A communications device for use in a wireless communications network, the wireless communications network comprising an infrastructure equipment providing a wireless access interface, the communications device comprising:

a transmitter configured to transmit uplink data via the wireless access interface, a receiver configured to receive signals, and a controller configured to control the transmitter and the receiver to:

receive an allocation message, the allocation message comprising an indication of first communications resources for transmitting of data from a first group of one or more of a plurality of logical channels and the allocation message is received in response to a second scheduling request message requesting the first communications resources for transmitting the data from the first group of the one or more logical channels which was transmitted after a first scheduling request message requesting second communications resources for transmitting data from a second group of the one or more of the plurality of logical channels, in response to receiving the allocation message, select a logical channel prioritisation (LCP) scheme for allocating a capacity provided by the first communications resources for transmitting the data from the first group of one or more of the logical channels or from the second group of the one or more of the logical channels using the first communications resources, the LCP scheme being selected from a plurality of LCP schemes, each of the plurality of LCP schemes determining a different allocation of an available capacity provided by the first communications resources for transmitting data from the plurality of logical channels, and select data from the plurality of logical channels to be transmitted using the first communications resources in accordance with the selected LCP scheme.

20. Infrastructure equipment for use in a wireless communications network, the infrastructure equipment providing a wireless access interface, the infrastructure equipment comprising:

a transmitter configured to transmit signals to a communications device via the wireless access interface in a cell, a receiver configured to receive data from the communications device, and a controller, configured to control the transmitter and the receiver to:

receive a first scheduling request message requesting second communications resources for transmitting data from a second group of one or more of a plurality of logical channels, after receiving the first scheduling request message, receive a second scheduling request message requesting first communications resources for transmitting data from a first group of the one or more logical channels, transmit an allocation message, the allocation message comprising an indication of the first communications resources for transmitting of data from the first group of one or more of a plurality of logical channels, determine a logical channel prioritisation (LCP) scheme, the determined LCP scheme being one of a plurality of LCP schemes, each of the plurality of LCP schemes determining a different allocation of an available capacity provided by the first communications resources for transmitting data from the plurality of logical channels, and receive data transmitted using the first communications resources, wherein the data transmitted using the first communications resources is selected from the plurality of logical channels in accordance with the determined LCP scheme.

* * * * *